United States Patent
Lo et al.

(10) Patent No.: US 8,362,494 B2
(45) Date of Patent: Jan. 29, 2013

(54) ELECTRO-OPTIC DEVICE WITH NOVEL INSULATING STRUCTURE AND A METHOD FOR MANUFACTURING THE SAME

(75) Inventors: Guo-Qiang Patrick Lo, Singapore (SG); Kee-Soon Darryl Wang, Singapore (SG); Wei-Yip Loh, Singapore (SG); Mingbin Yu, Singapore (SG); Junfeng Song, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 12/672,369

(22) PCT Filed: Aug. 8, 2007

(86) PCT No.: PCT/SG2007/000241
§ 371 (c)(1),
(2), (4) Date: Mar. 31, 2011

(87) PCT Pub. No.: WO2009/020432
PCT Pub. Date: Feb. 12, 2009

(65) Prior Publication Data
US 2011/0180795 A1    Jul. 28, 2011

(51) Int. Cl.
| | |
|---|---|
| *H01L 27/15* | (2006.01) |
| *H01L 29/26* | (2006.01) |
| *H01L 31/12* | (2006.01) |
| *H01L 33/00* | (2010.01) |
| *H01L 29/732* | (2006.01) |
| *H01L 31/0328* | (2006.01) |
| *H01L 31/0336* | (2006.01) |
| *H01L 31/072* | (2006.01) |
| *H01L 31/109* | (2006.01) |
| *H01L 31/00* | (2006.01) |
| *H01L 29/06* | (2006.01) |

(52) U.S. Cl. ............ 257/79; 257/13; 257/21; 257/80; 257/184; 257/466; 257/E31.003; 257/E31.005; 257/E31.032; 257/E31.038; 257/E33.005; 257/E33.006; 257/E33.012; 257/E33.014

(58) Field of Classification Search ............ 257/13, 257/21, 79, 80, 184, 466, E31.003, E31.005, 257/E31.032, E31.038, E33.005, E33.006, 257/E33.012, E33.014
See application file for complete search history.

(56) References Cited

U.S. PATENT DOCUMENTS
5,538,221 A * 7/1996 Joswig ............... 251/129.17
6,215,132 B1 * 4/2001 Nettelbladt et al. ........ 257/93
(Continued)

FOREIGN PATENT DOCUMENTS
DE    102004007251 A1    9/2005
WO    2004/088394 A2    10/2004

OTHER PUBLICATIONS

Barrios, C. et al. "Modeling and analysis of high-speed electro-optic modulation in high confinement silicon waveguides using metal-oxide-semiconductor configuration," Journal of Applied Physics, vol. 96, No. 11, (Dec. 2004) pp. 6008-6015.

(Continued)

*Primary Examiner* — Ida M Soward
(74) *Attorney, Agent, or Firm* — Duan Wu; Milstein Zhang & Wu LLC

(57) ABSTRACT

An electro-optic device is disclosed. The electro-optic device includes an insulating layer, a first semiconducting region disposed above the insulating layer and being doped with doping atoms of a first conductivity type, a second semiconducting region disposed above the insulating layer and being doped with doping atoms of a second conductivity type and an electro-optic active region disposed above the insulating layer and between the first semiconducting region and the second semiconducting region. The electro-optic active region includes a first partial active region and a second partial active region and an insulating structure in between. The insulating structure extends perpendicular to the surface of the insulating layer such that there is no overlap of the first partial active region and the second partial active region in the direction perpendicular to the surface of the insulating layer. A method for manufacturing is also disclosed.

21 Claims, 24 Drawing Sheets

U.S. PATENT DOCUMENTS

| | | | |
|---|---|---|---|
| 6,845,198 B2 | 1/2005 | Montgomery et al. | |
| 7,035,487 B2 | 4/2006 | Samara-Rubio et al. | |
| 7,085,443 B1 | 8/2006 | Gunn, III et al. | |
| 7,116,847 B2 | 10/2006 | Liu et al. | |
| 7,127,129 B2 | 10/2006 | Liu | |
| 7,148,514 B2* | 12/2006 | Seo et al. | 257/79 |
| 7,569,865 B2* | 8/2009 | Lee et al. | 257/99 |
| 7,719,077 B2* | 5/2010 | Kohlmann Von-Platen et al. | 257/500 |
| 7,741,776 B2* | 6/2010 | Murayama et al. | 313/512 |
| 7,781,246 B2* | 8/2010 | Kim et al. | 438/43 |
| 8,008,678 B2* | 8/2011 | Tran et al. | 257/98 |
| 8,120,079 B2* | 2/2012 | Augusto | 257/292 |
| 8,143,112 B1* | 3/2012 | Doan et al. | 438/141 |
| 2004/0075115 A1* | 4/2004 | Fery et al. | 257/200 |
| 2004/0223768 A1 | 11/2004 | Shastri et al. | |
| 2005/0179986 A1 | 8/2005 | Gothoskar et al. | |
| 2005/0189591 A1 | 9/2005 | Gothoskar et al. | |
| 2006/0063679 A1 | 3/2006 | Yue et al. | |
| 2007/0290604 A1* | 12/2007 | Sakanoue et al. | 313/503 |
| 2008/0173884 A1* | 7/2008 | Chitnis et al. | 257/98 |
| 2008/0179602 A1* | 7/2008 | Negley et al. | 257/88 |
| 2008/0211416 A1* | 9/2008 | Negley et al. | 315/193 |
| 2009/0093075 A1* | 4/2009 | Chu et al. | 438/33 |
| 2009/0244439 A1* | 10/2009 | Hamada | 349/61 |

OTHER PUBLICATIONS

Dainesi, P., et al. "CMOS Compatible Fully Integrated Mach-Zehnder Interferometer in SOI Technology," IEEE Photonics Technology Letters, vol. 12, No. 6, (Jun. 2000) pp. 660-662.

Gan, F. et al., "High-speed silicon electrooptic modulator design," IEEE Photonics Technology Letters, vol. 17, No. 5, (May 2005), pp. 1007-1009.

Gu, L. et al. "High speed silicon photonic crystal waveguide modulator for low voltage operation," Applied Physics Letters 90, 071105 (Feb. 2007) pp. 1-3.

Liao, L. et al. "Phase Modulation Efficiency and Transmission Loss of Silicon Optical Phase Shifters" IEEE Journal of Quantum Electonics, vol. 41, No. 2. (Feb. 2005) pp. 250-256.

Liu, A. et al. "Scaling the Modulation Bandwidth and Phase Efficiency of a Silicon Optical Modulator," IEEE Journal of selected topics in quantum electronics., vol. 11, No. 2, (Mar./Apr. 2005). pp. 367-372.

Moselund, K.E. et al. "Compact gate-all-around silicon light modulator for ultra high speed operation," Sensors and Actuators A130-131. (2006) pp. 220-227.

Png, C. et al., "Optical Phase Modulators for MHz and GHz Modulation in Silicon-On-Insulator (SOI)," Journal of Lightwave Technology, vol. 22, No. 6, (Jun. 2004) pp. 1573-1582.

Soref, R. et al. "Electrooptical Effects in Silicon," IEEE Journal of Quantum Electronics, vol. QE-23, No. 1, (1987) pp. 123-129.

Tu, X. et al. "A High-performance Si-based MOS Electrooptic Phase Modulator With a Shunt-Capacitor Configuration," Journal of Lightwave Technology, vol. 24, No. 2, (Feb. 2006) pp. 1000-1007.

Xu, Q. et al. "Micrometre-scale silicon electro-optic modulator," Nature, vol. 435, (2005) pp. 325-327.

Xu, Q. et al. "Micrometer-scale all-optical wavelength converter on silicon," Optics Letters, vol. 30, No. 20 (Oct. 15, 2005) pp. 2733-2735.

* cited by examiner

500

ELECTRO-OPTIC DEVICE WITH NOVEL INSULATING STRUCTURE AND A METHOD FOR MANUFACTURING THE SAME

FIELD OF THE INVENTION

Embodiments of the invention relate to field of electro-optic devices. By way of example, embodiments of the invention relate to an electro-optic modulator and a method for manufacturing the same.

BACKGROUND OF THE INVENTION

Silicon-based modulators have received considerable attention in recent years. In silicon, the modulation mechanism is dominated by free-carrier plasma dispersion effect (FCPD). The FCPD effect occurs when a variation in the free carrier concentration causes a corresponding change in refractive index and optical extinction coefficient or absorption coefficient, leading to phase-shift. Free carrier concentration can be varied either by using p-i-n diodes, or metal-oxide-semiconductor (MOS) capacitors based device structures.

Pin offers high effective refractive index variation and hence high phase modulation efficiency. However, speed rarely exceeds 1 GHz due to its long carrier recombination process. The MOS modulation scheme, in contrast, can offer high speed and zero DC power. However, in MOS accumulation the carriers are concentrated near the gate dielectric in very thin region, e.g., about a 10 nm thin layer. Thus the free carrier optical overlap is very small, resulting in a relatively low effective real refractive index change for the similar electrical field applied or power. For a $\pi$ phase shift to occur as required to achieve signal modulation, a long phase shifter length will then be needed.

In relation to variation of free carrier concentration using p-i-n diodes, an approach is disclosed in publication "Micrometer-scale silicon electro-optic modulator", Qianfan Xu et al., Nature, Vol. 435, pp. 325-327, 2005. The publication discloses a silicon electro-optic modulator. The modulator consists of a ring resonator coupled to a single waveguide. The transmission of the waveguide is highly sensitive to the signal wavelength and is greatly reduced at wavelengths in which the ring circumference corresponds to an integer number of guided wavelengths. By tuning the effective index of the ring resonator, the resonance wavelength is modified, which induces a strong modulation of the transmitted signal. Thus the effective index of the ring resonator is modulated electrically by injecting electrons and holes using a p-i-n junction embedded in the ring resonator.

Another similar approach using p-i-n diodes is disclosed in publication "High-speed silicon electrooptic modulator design", Fuwan Gan et al., IEEE Photonics Technology Letters, Vol. 17, No. 5, May 2005, 1007-1009. The publication discloses a high-speed electronic carrier-injection modulator based on a high-index-contrast split-ridge waveguide and integrated p-i-n-diode section. The split-ridge waveguide includes a high-index ridge separated from a high-index slab via a thin low index layer, thereby combining the advantages of a buried waveguide and a ridge waveguide. The index layer which splits the ridge wave-guide is rather thin, so that there is a good heat sinking to the slab portion of the waveguide acting as a heat spreader. The optical mode is well confined within the ridge in horizontal direction, which greatly reduces loss due to highly doped contact regions and sidewall roughness.

Yet another similar approach using p-i-n diode is disclosed in publication "Optical Phase Modulators for MHz and GHz Modulation in Silicon-On-Insulator (SOI)", Ching Eng Png et al., Journal of Lightwave Technology, Vol. 22, No. 6, June 2004. Publication discloses a low-loss single-mode optical phase modulator based on silicon-on-insulator (SOI) material. The modulator operates by injecting free carriers to change the refractive index in the guiding region. The overlap between the injected free carriers in the intrinsic region and the propagating optical mode has been optimized and a particular p-i-n device geometry where two n+ regions are joined as a common cathode has been employed.

In relation to variation of free carrier concentration using MOS capacitors, an approach is disclosed in U.S. Pat. No. 6,845,198. The patent discloses a silicon-based electro-optic modulator based on forming a gate region of a first conductivity to partially overlap a body region of a second conductivity type, with a relatively thin dielectric layer interposed between the contiguous portions of the gate and body regions. The modulator may be formed on an SOI platform, with the body region formed in the relatively thin silicon surface layer of the SOI structure and the gate region formed of a relatively thin silicon layer overlying the SOI structure. The doping in the gate and body regions is controlled to form lightly doped regions above and below the dielectric, thus defining the active region of the device. The optical electric field essentially coincides with the free carrier concentration area in the active device region. The application of a modulation signal causes simultaneous accumulation, depletion or inversion of free carriers on both sides of the dielectric at the same time, resulting in high speed operation.

A similar approach using MOS capacitors is disclosed in publication "Scaling the Modulation Bandwidth and Phase Efficiency of a Silicon Optical Modulator", Ansheng Liu et al., IEEE Journal of selected topics in quantum electronics., Vol. 11, No. 2, March/April 2005. The publication discloses an all-silicon optical modulator based on a silicon waveguide phase shifter containing a MOS capacitor. The publication discloses that shrinking the waveguide size and reducing gate oxide thickness significantly enhances the phase modulation efficiency because of the optical field enhancement in the voltage induced charge layers of the MOS capacitor, which, in turn, induces refractive index change, and thus phase change in silicon due to free carrier dispersion effects.

Another approach using MOS capacitors is disclosed in publication "Phase Modulation Efficiency and Transmission Loss of Silicon Optical Phase Shifters", Ling Liao et al., IEEE Journal of Quantum Electronics, Vol. 41, No. 2, February 2005. The publication focuses on understanding phase modulation efficiency and optical loss of MOS-capacitors-based silicon waveguide phase shifters. In the publication, a total of nine designs have been fabricated using poly-silicon and characterized at wavelengths around 1.55 µm. Detailed comparison of design parameters shows that scaling down the waveguide dimensions, placing the capacitor gate oxide near the center of the optical mode, and reducing the oxide thickness significantly enhances phase modulation efficiency.

Yet another approach using MOS capacitors is disclosed in publication "A High-performance Si-based MOS Electrooptic Phase Modulator With a Shunt-Capacitor Configuration", Xiaoguang Tu et al., Journal of Lightwave Technology, Vol. 24, No. 2, February 2006. The publication proposes enhancing the optical overlap by introducing two dielectric layers and employing a high-confinement waveguide design. The $V\pi L\pi$ figure-of-merit achieved is approximately 1.0 Vcm in order to achieve 180 degree or $\pi$-shift of its phase change under 1V applied on a 1 cm long device. The publication discloses a novel Si-based MOS electro-optic phase modulator including two shunt oxide layer capacitors integrated on a SOI waveguide. The refractive index near the two gate oxide layers is modified by the free carrier dispersion effect induced by applying a positive bias on the electrodes. The theoretical calculation of free carrier distribution coupled with optical guided mode propagation characteristics has been carried out and the influence of the structure parameters such as the width and the doping level of the active region are analyzed.

Publication "Compact gate-all-around silicon light modulator for ultra high speed operation", K. E. Moselund et al., Sensors and Actuators A130-131, pp. 220-227, 2006 also attempted to enhance the optical overlap by proposing a Gate-All-Round (GAA) sub-micrometer-scale waveguide and achieved a $V\pi L\pi$ of ~0.45 Vcm. The publication discloses a GAA MOS capacitor consisting of a silicon nano-wire (Si-NW) surrounded by a thin gate oxide and a polysilicon gate. The light propagates in the entire GAA structure and not only the Si-NW.

Yet a further approach using MOS capacitors is disclosed in publication "Modeling and analysis of high-speed electro-optic modulation in high confinement silicon waveguides using metal-oxide-semiconductor configuration", C. A. Barrios et al., Journal of Applied Physics, Vol. 96, No. 11, December, 2004. The publication analyzes the electrical and optical properties of a silicon electro-optic waveguide modulator using a MOS configuration. The device performance is studied under different modes of operation of the MOS diode and gate oxide thickness. The waveguide modulator structure consist of a high aspect ratio rib SOI waveguide with highly doped regions defined in the slab at each side of the rib. A poly-silicon layer acts as a gate electrode, whereas the lateral highly doped regions operate as ground electrodes. A top $SiO_2$ cladding layer covers the whole structure.

SUMMARY OF THE INVENTION

In one embodiment of the invention, an electro-optic device is provided. The electro-optic device includes an insulating layer, a first semiconducting region disposed above the insulating layer and being doped with doping atoms of a first conductivity type, a second semiconducting region disposed above the insulating layer and being doped with doping atoms of a second conductivity type and an electro-optic active region disposed above the insulating layer and between the first semiconducting region and the second semiconducting region. The electro-optic active region includes a first semiconducting partial active region being doped with doping atoms of the first conductivity type, a second semiconducting partial active region being doped with doping atoms of the second conductivity type and an insulating structure between the first semiconducting partial active region and the second semiconducting partial active region, wherein the insulating structure extends perpendicular to the surface of the insulating layer such that there is no overlap of the first semiconducting partial active region and the second semiconducting partial active region in the direction perpendicular to the surface of the insulating layer.

In one embodiment of the invention, a method for manufacturing an electro-optic device is provided. The method includes forming a first semiconducting region on an insulating layer and doping with doping atoms of a first conductivity type, forming a second semiconducting region on the insulating layer and doping with doping atoms of a second conductivity type and forming an electro-optic active region on the insulating layer and between the first semiconducting region and the second semiconducting region. Forming the electro-optic active region includes forming a first semiconducting partial active region being doped with doping atoms of the first conductivity type, forming a second semiconducting partial active region being doped with doping atoms of the second conductivity type and forming an insulating structure between the first semiconducting partial active region and the second semiconducting partial active region, wherein the insulating structure extends perpendicular to the surface of the insulating layer such that there is no overlap of the first semiconducting partial active region and the second semiconducting partial active region in the direction perpendicular to the surface of the insulating layer.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In an embodiment of the invention, an electro-optic device is provided that is able to achieve both high phase efficiency and high speed.

Figure 1:
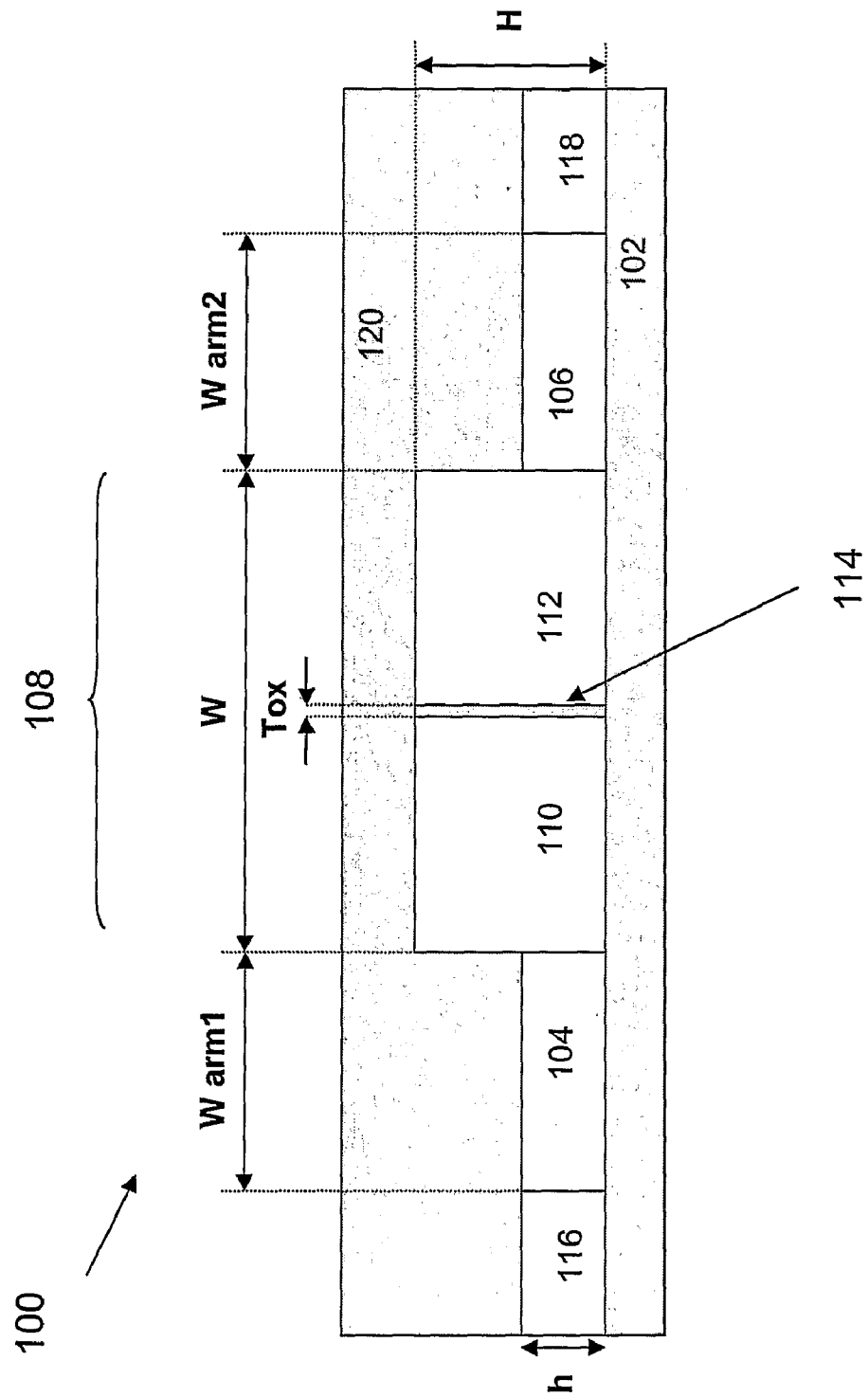
FIG. 1 shows a cross-sectional view of an electro-optic device in accordance with an embodiment of the invention.

FIG. 1 shows a cross-sectional view of an electro-optic device 100 in accordance with an embodiment of the invention. The electro-optic device 100 includes a starting insulating layer 102 or a dielectric layer. The insulating layer 102 may be an oxide layer, for example silicon oxide ($SiO_2$) or a buried oxide layer. Nevertheless, any other suitable insulating material can be used for the insulating layer 102. The electro-optic device 100 further includes a first semiconducting region 104 disposed above the insulating layer 102 and being doped with doping atoms of a first conductivity type and a second semiconducting region 106 disposed above the insulating layer 102 and being doped with doping atoms of a second conductivity type. The first semiconducting region 104 is typically a bulk silicon (Si) substrate (or wafer) and the second semiconducting region 106 is typically poly-silicon (poly-Si). Nevertheless, the first semiconducting region 104 may also be poly-Si and the second semiconducting region 106 may also be a bulk Si substrate according to chosen process technology of constructing the device. Any other suitable semiconductor material can be used for the first semiconducting region 104 and the second semiconducting region 106. The first conductivity type is typically p-conductivity type and the second conductivity type is typically n-conductivity type, however, the first conductivity type may also be n-type conductivity and the second conductivity type may also be p-type conductivity type, as long as the first and second conductivity types are different according to the chosen electrical biasing conditions.

The electro-optic device 100 further comprises an electro-optic active region 108 disposed above the insulating layer 102 and between the first semiconducting region 104 and the second semiconducting region 106. The electro-active region 108 includes a first semiconducting partial active region 110 being doped with doping atoms of a first conductivity type, a second semiconducting partial active region 112 being doped with doping atoms of the second conductivity type and an insulating structure 114 between the first semiconducting partial active region 110 and the second semiconducting partial active region 112, wherein the insulating structure 114 extends perpendicular to the surface of the insulating layer 102 such that there is no overlap of the first semiconducting partial active region 110 and the second semiconducting partial active region 112 in the direction perpendicular to the surface of the insulating layer 102. The insulating structure 114 extends from the surface of the insulating layer 102 through the electro-optic active region 108 to the top of the electro-optic active region 108. The first semiconducting partial active region 110 is in electrical contact with the first semiconducting region 104 and the second semiconducting partial active region 112 is in electrical contact with the second semiconducting region 106.

The electro-optic active region 108 has a rib-shape with a larger height than the first semiconducting region 104 and the second semiconducting region 106 relative to the surface of the insulating layer 102. The electro-optic active region 108 has a width denoted by W in the range from about 1000 A to about 7000 A and a height denoted by H in the range from about 1000 A to 4000 A. Typical W/H can be 4000 A/2500 A. The first semiconducting region 104 has a width denoted by Warm1 in the range from about 0 A to about 3000 A and the second semiconducting region 106 has a width also denoted by Warm2 in the range from about 0 A to about 3000 A. The choice of arm length is between the resistance concern and optical loss from the proximity of the center optical profile to high dopant area. The first semiconducting region 104 and the second semiconducting region 106 have a height denoted by h in the range from about 1000 A to 7000 A.

The first semiconducting partial active region 110 is typically of the same material as the first semiconducting region 104 and the second semiconducting partial active region 112 is typically of the same material as the second semiconducting region 106. The first semiconducting partial active region 110, like the first semiconducting region 104 is typically a bulk silicon (Si) substrate (or wafer) and the second semiconducting partial active region 112, like the second semiconducting region 106 is typically poly-silicon (poly-Si). Nevertheless, the first semiconducting partial active region 110 may also be poly-Si and the second semiconducting partial active region 112 may also be a bulk Si substrate. Any other suitable semiconductor material can be used for the first semiconducting partial active region 110 and the second semiconducting partial active region 112.

The insulating structure 114 may be a dielectric layer or an oxide layer, for example $SiO_2$. Nevertheless, any other suitable insulating material can be used for the insulating structure 114. The insulating structure 114 has a thickness in the direction from the first semiconducting partial active region 110 to the second semiconducting partial active region 112 denoted by Tox in the range from about 2 nm to about 50 nm, typically between 5 nm to 30 nm. The dielectric shall be electrically able to induce the carrier density change as to accumulation or depletion effectively, while optically be low loss to the guided light.

The first semiconducting region 104 is in further contact with an electrode 116 of a corresponding conductivity type and the second semiconducting region 106 is also in further contact with an electrode 118 of the corresponding conductivity type.

The electro-optic device 100 further comprises an oxide cladding layer 120 covering the electrodes 116, 118, the first 104 and second 106 semiconducting regions, the first 110 and second 112 semiconducting partial active regions and the insulating structure 114. The oxide cladding layer 120 is typically $SiO_2$ but nevertheless, any other suitable insulating material can be used for the oxide cladding layer 120. The cladding layer is to provide sufficient refractive index contrast between that of cladding to the waveguide or phase shifter material, so the light can be confined and thus guided effectively with loss propagation loss with minimum leakage into the cladding layer. Air is perfect for it large index contrast, but in real device application, the structure will be needed as mechanical surrounding for further device integration. Oxide has low refractive index and commonly used as cladding layer as well as electrical isolating films to allow specific contact formations to contact with the electrical electrode for biasing.

Figure 2A:
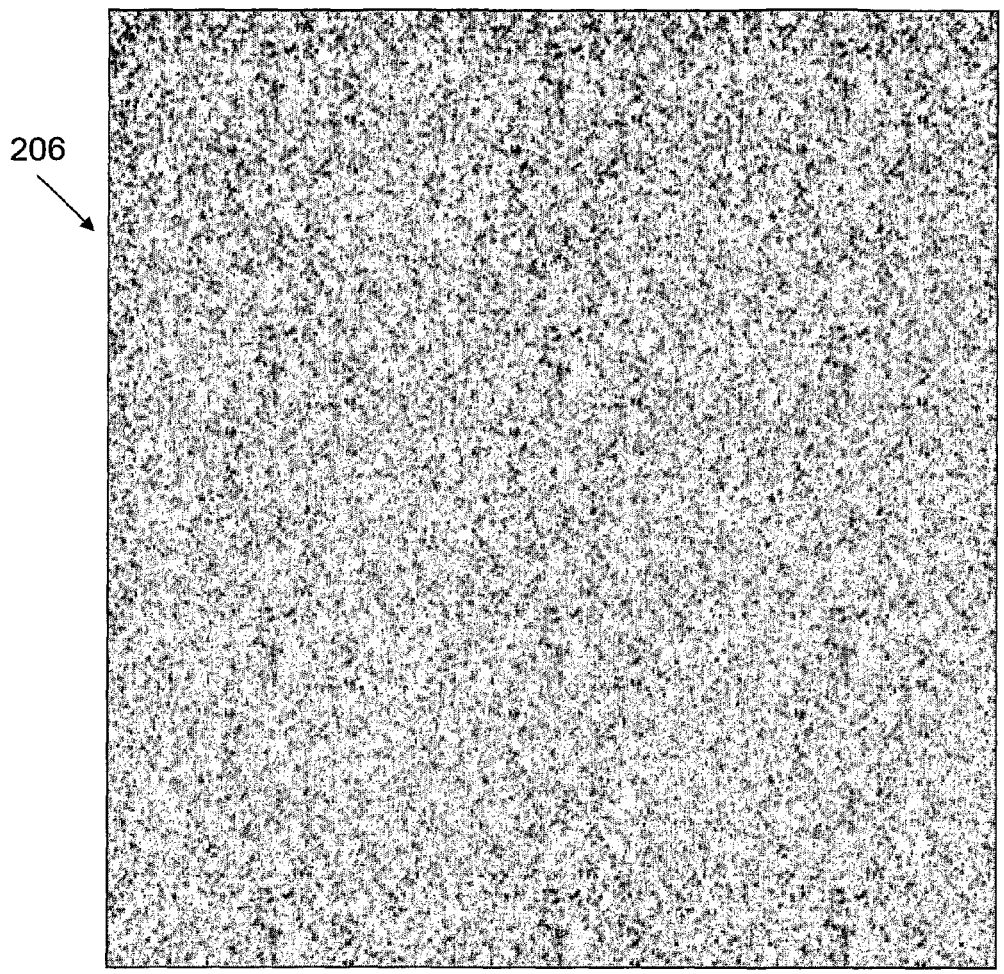
FIGS. 2A to 2Q show respective top and cross-sectional views illustrating processes for manufacturing an electro-optic device and a photo-detector in accordance with an embodiment of the invention.
Figure 2A:
Figure 2B:
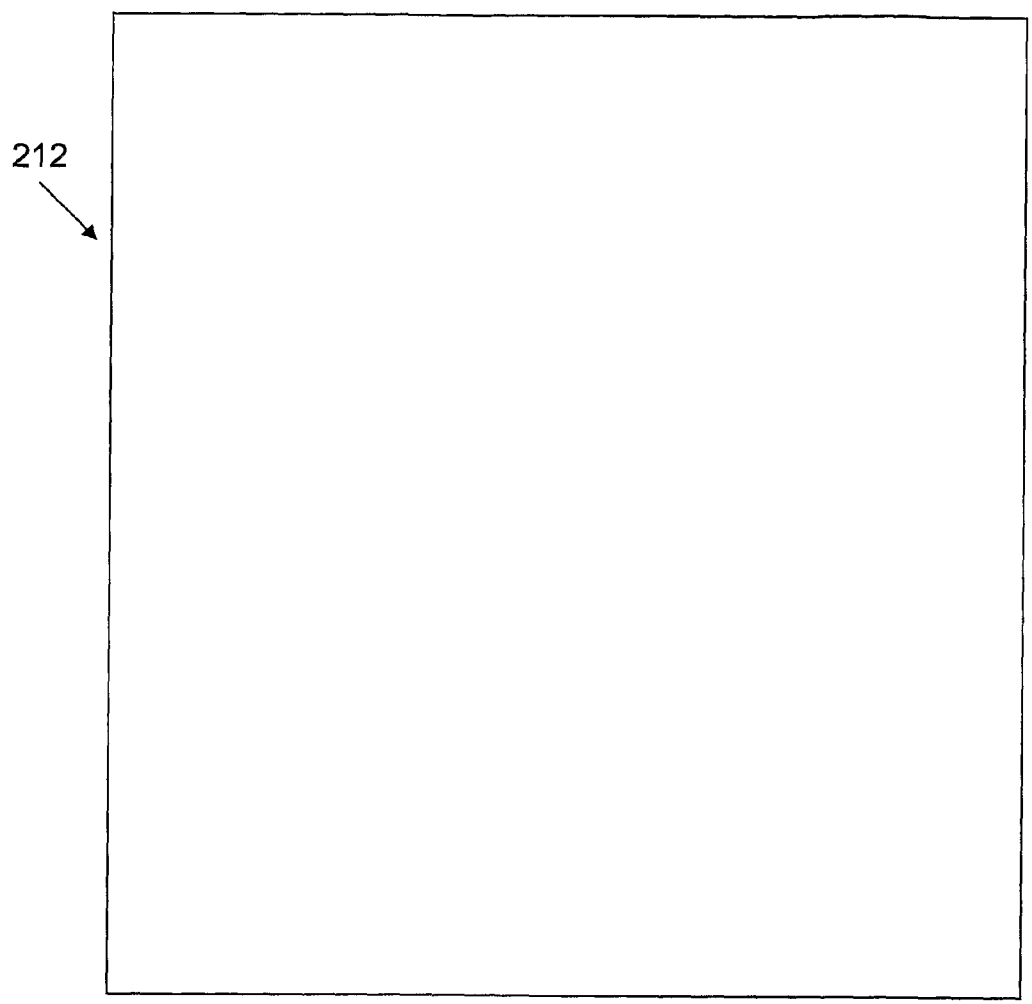
Figure 2B:
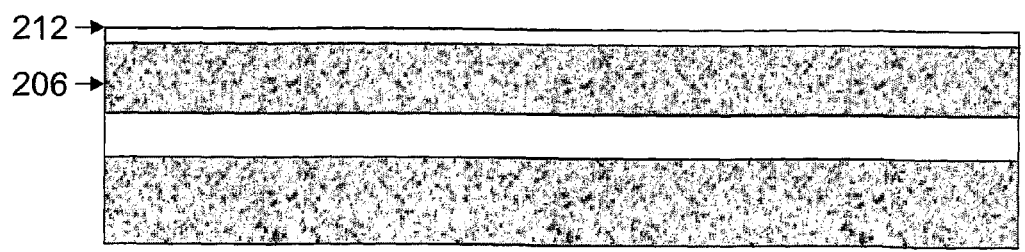
Figure 2C:
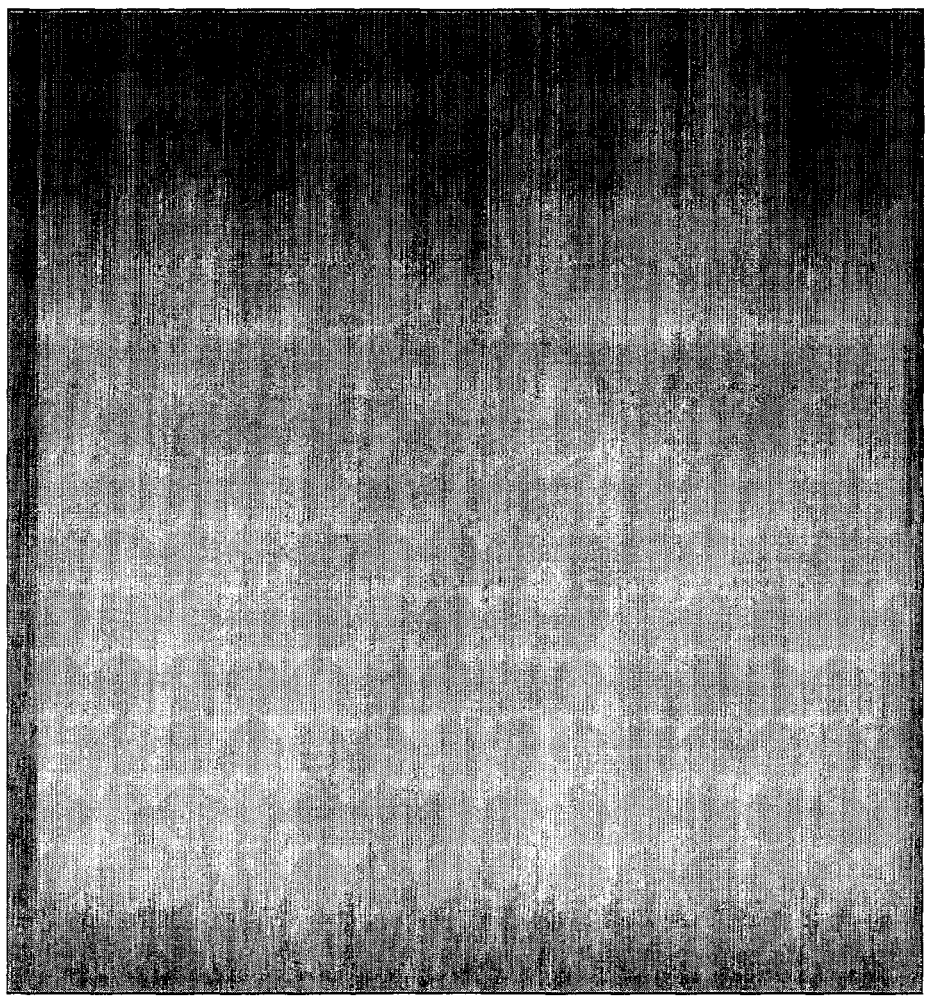
Figure 2C:
Figure 2D:
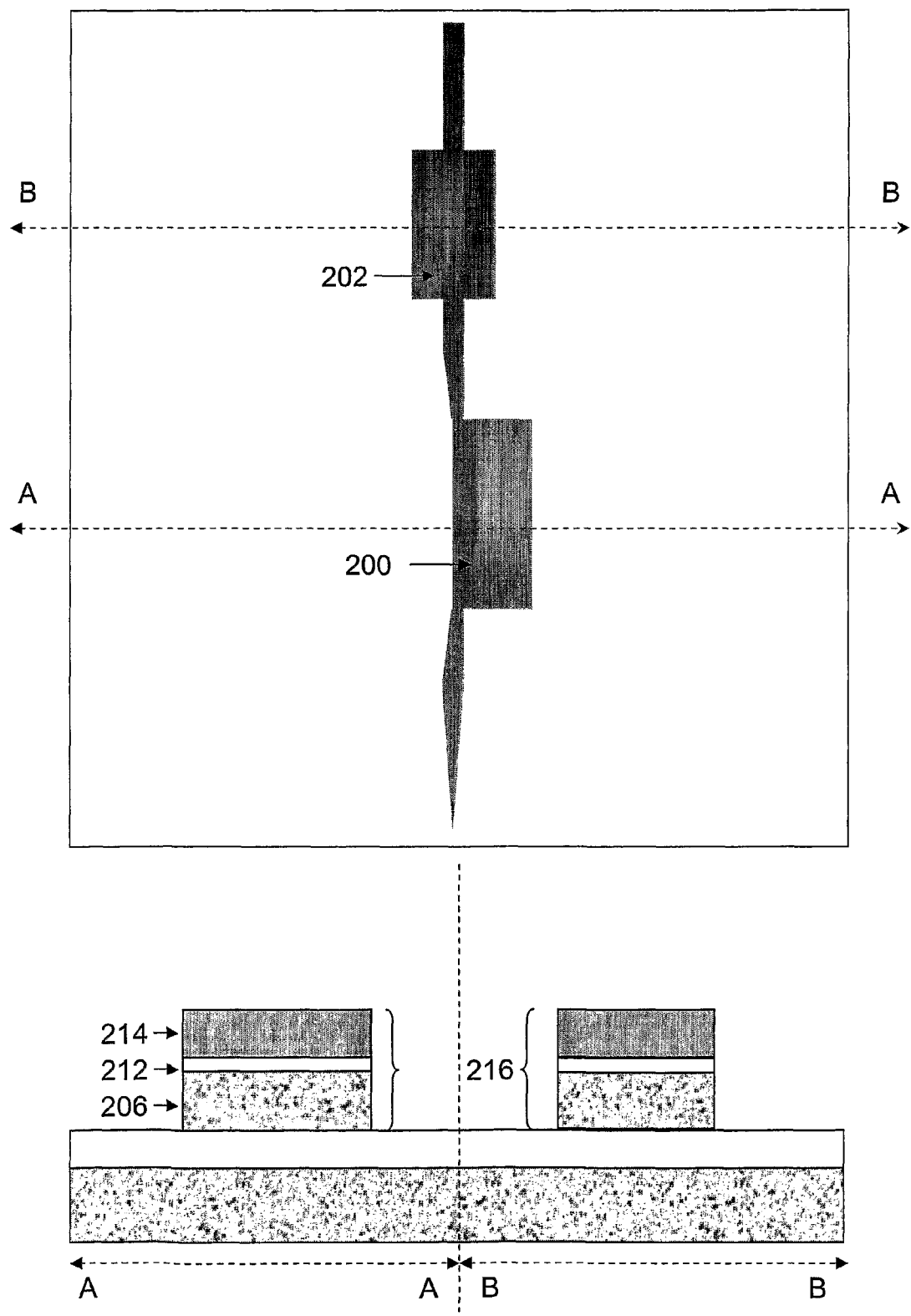
Figure 2E:
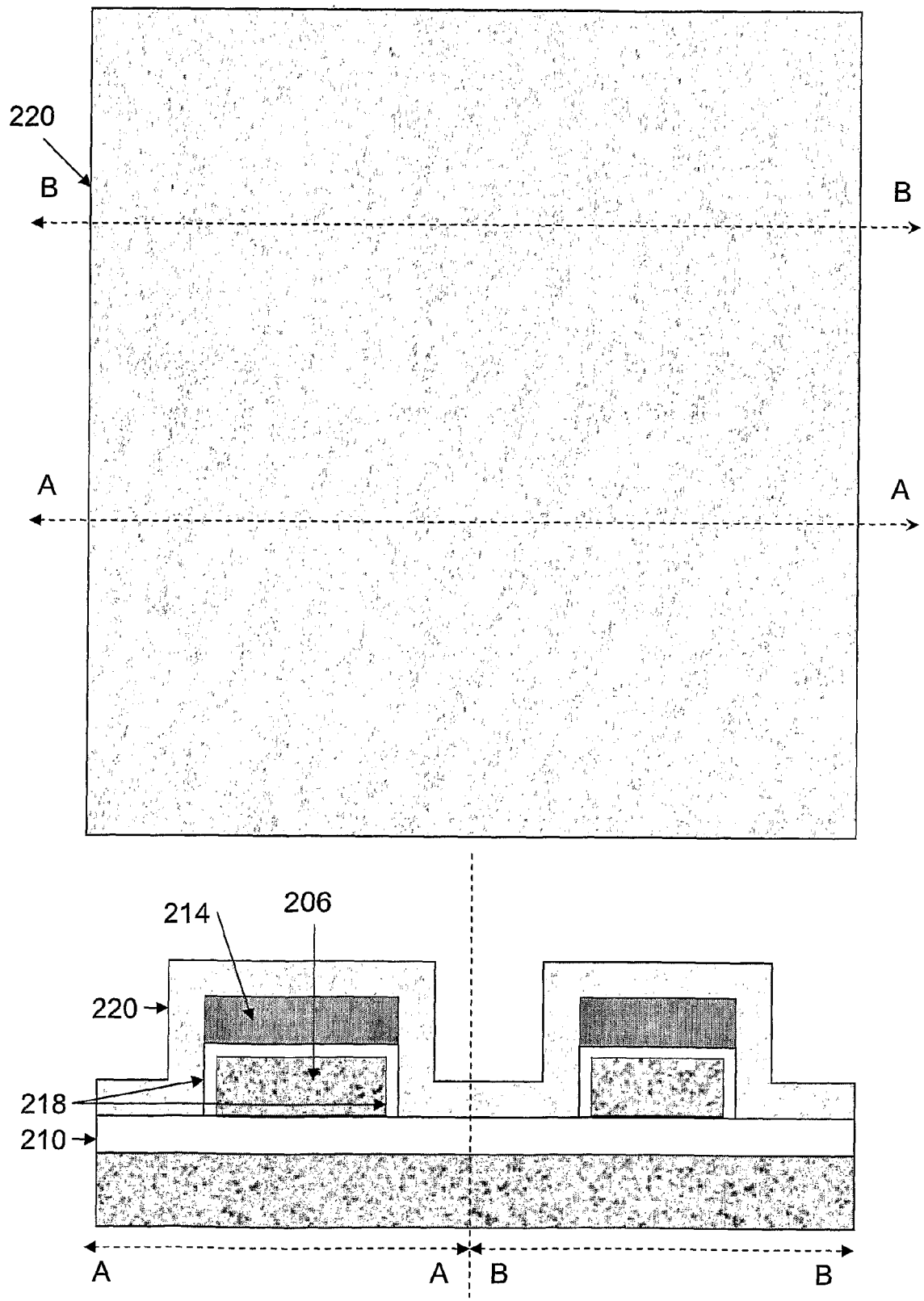
Figure 2F:
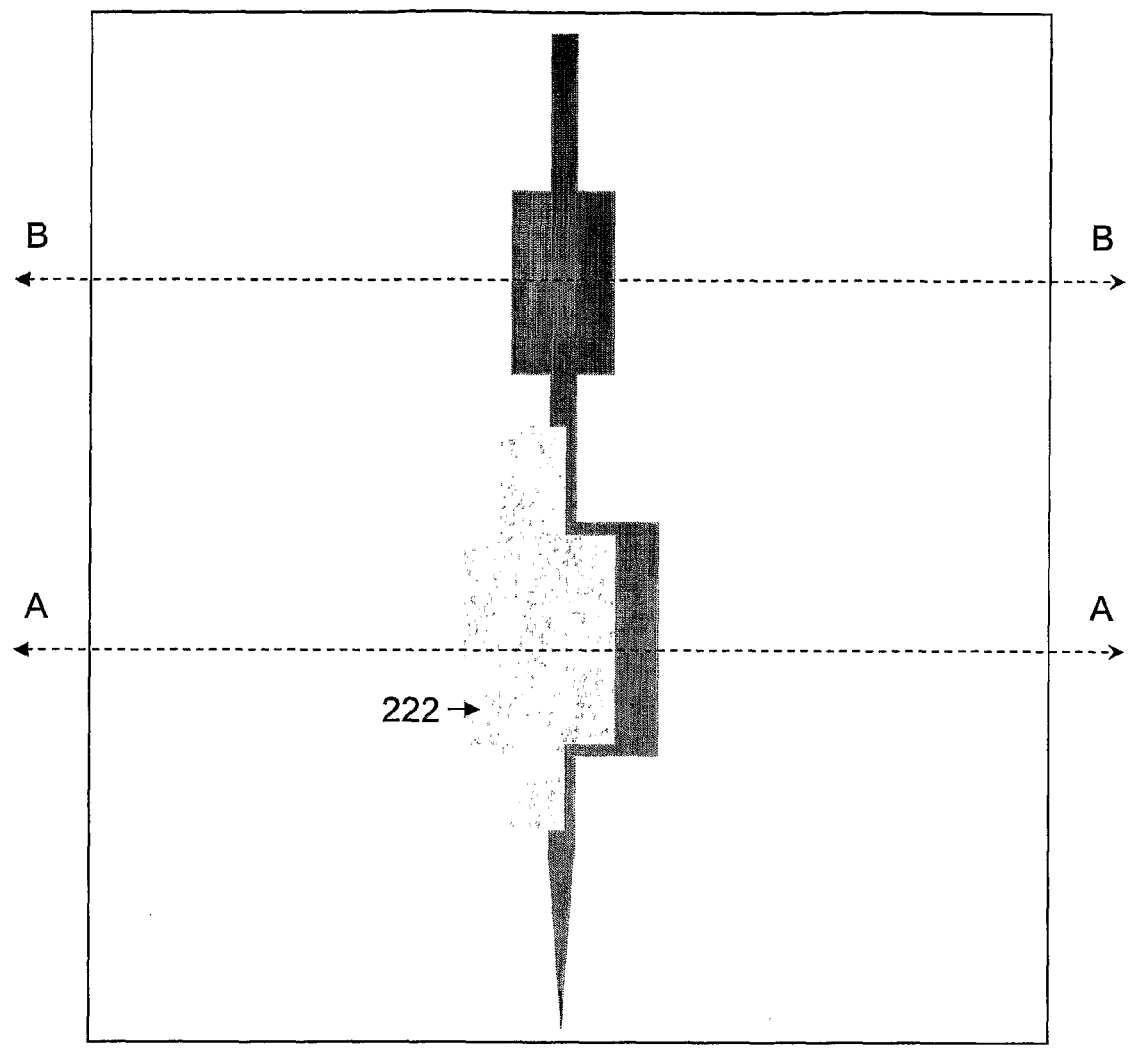
Figure 2F:
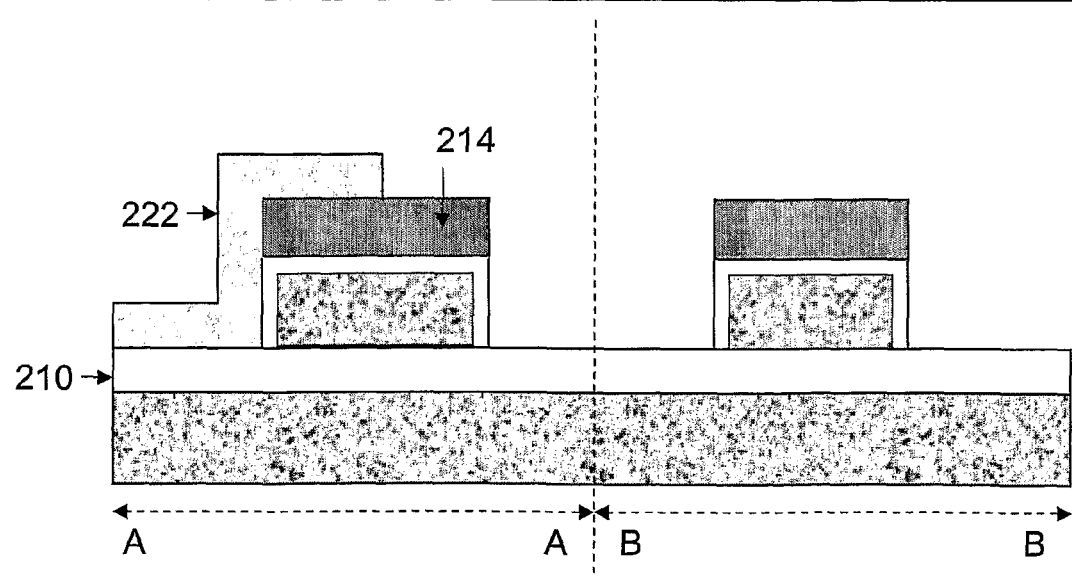
Figure 2G:
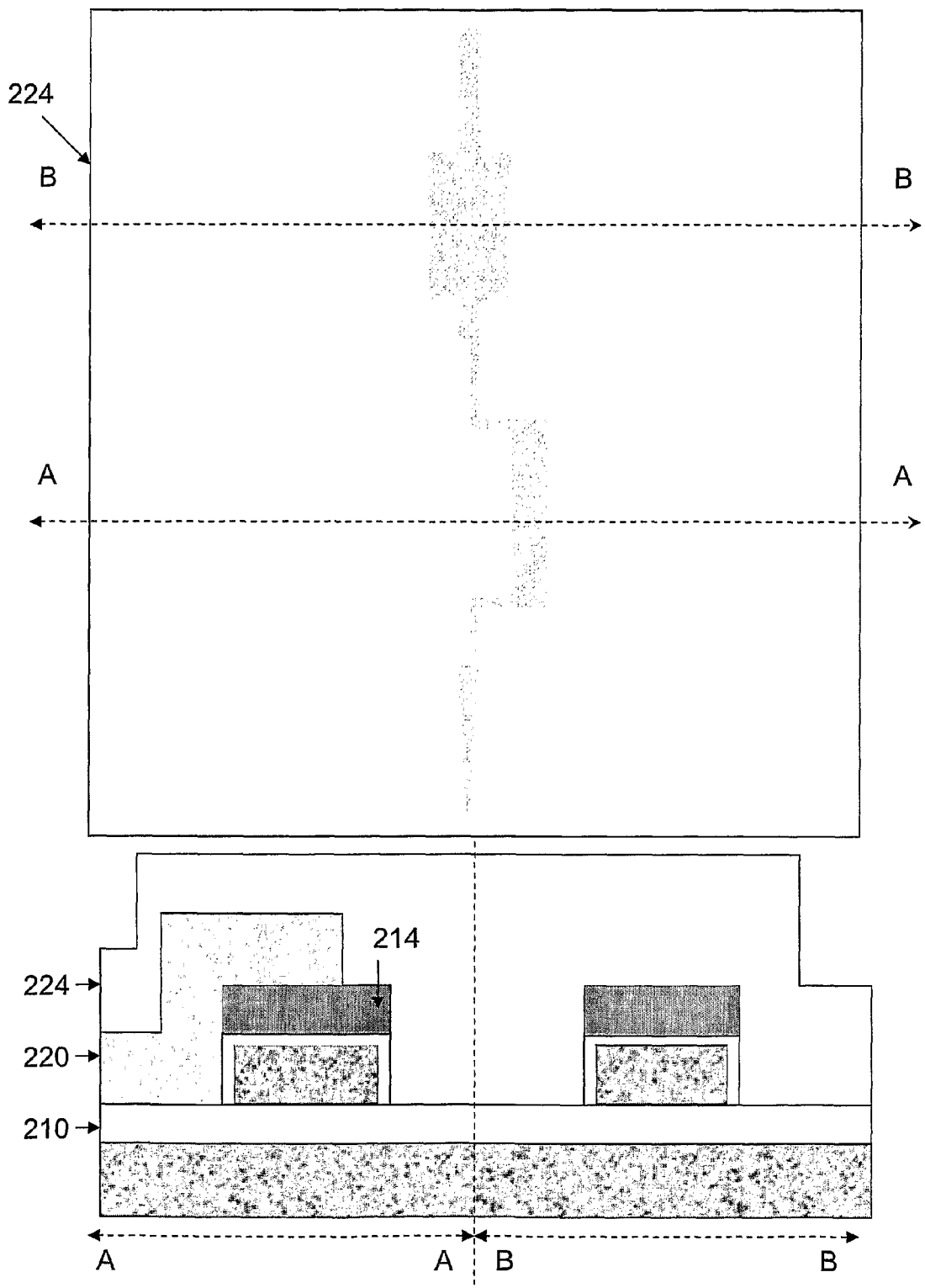
Figure 2H:
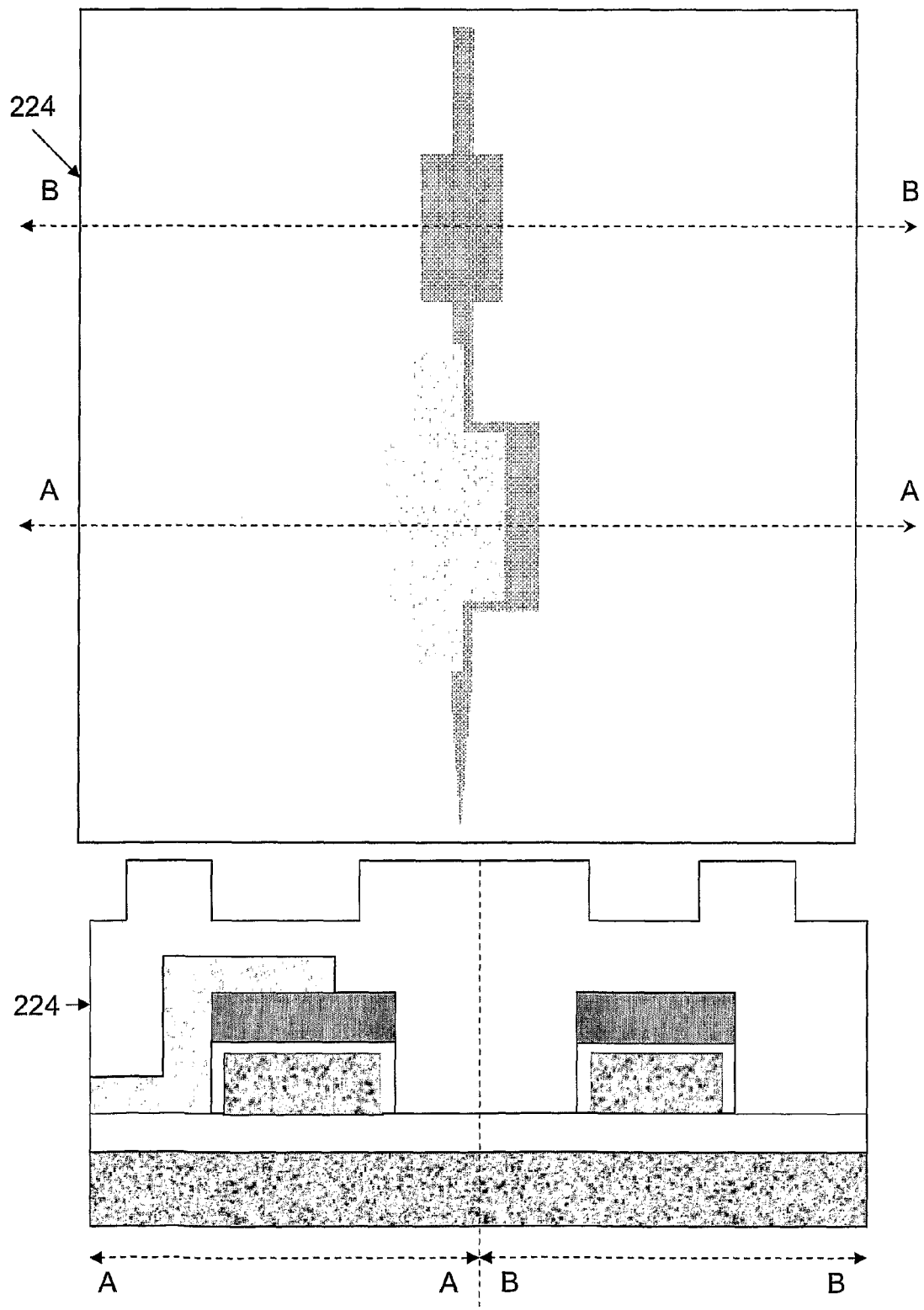
Figure 2I:
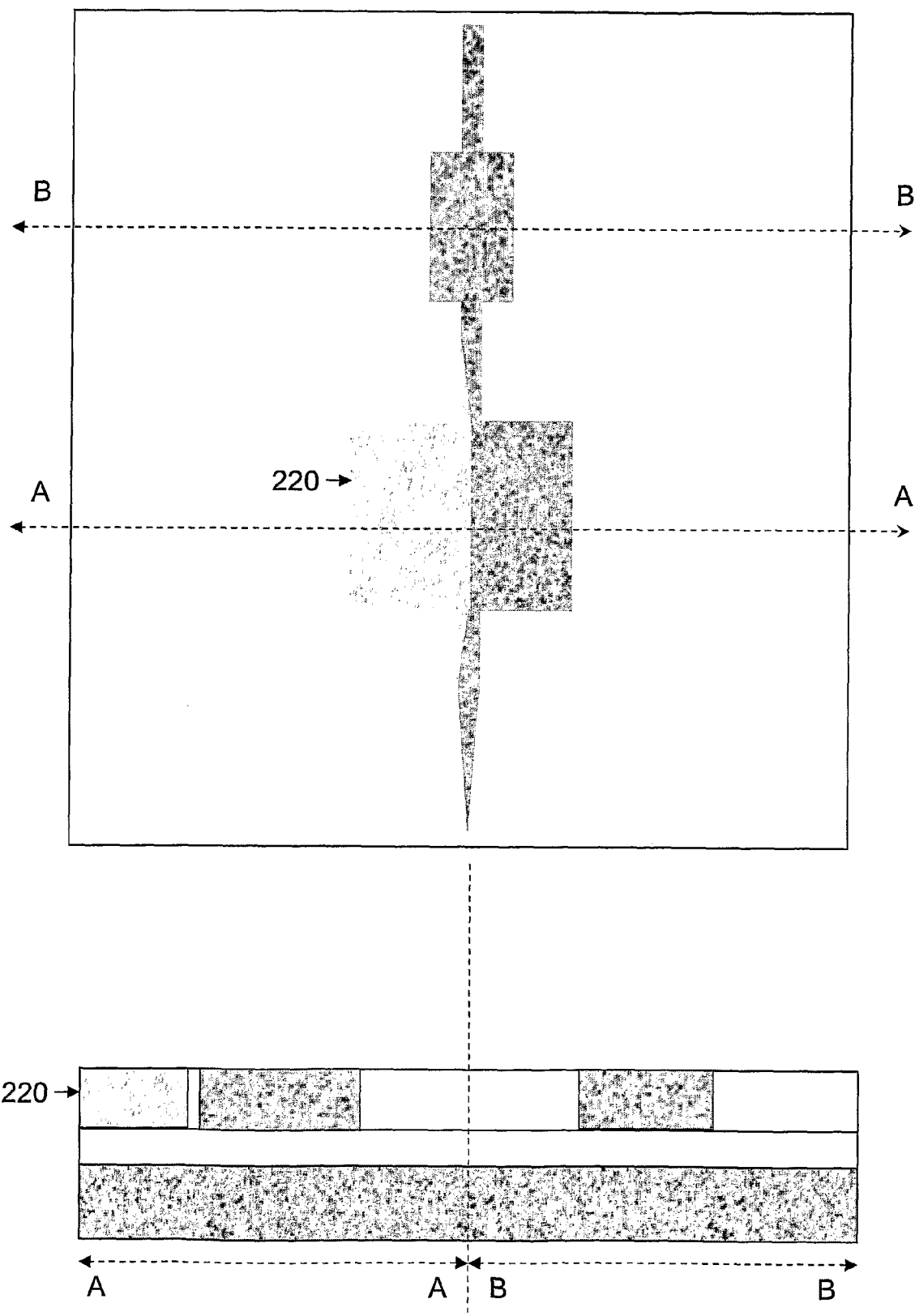
Figure 2J:
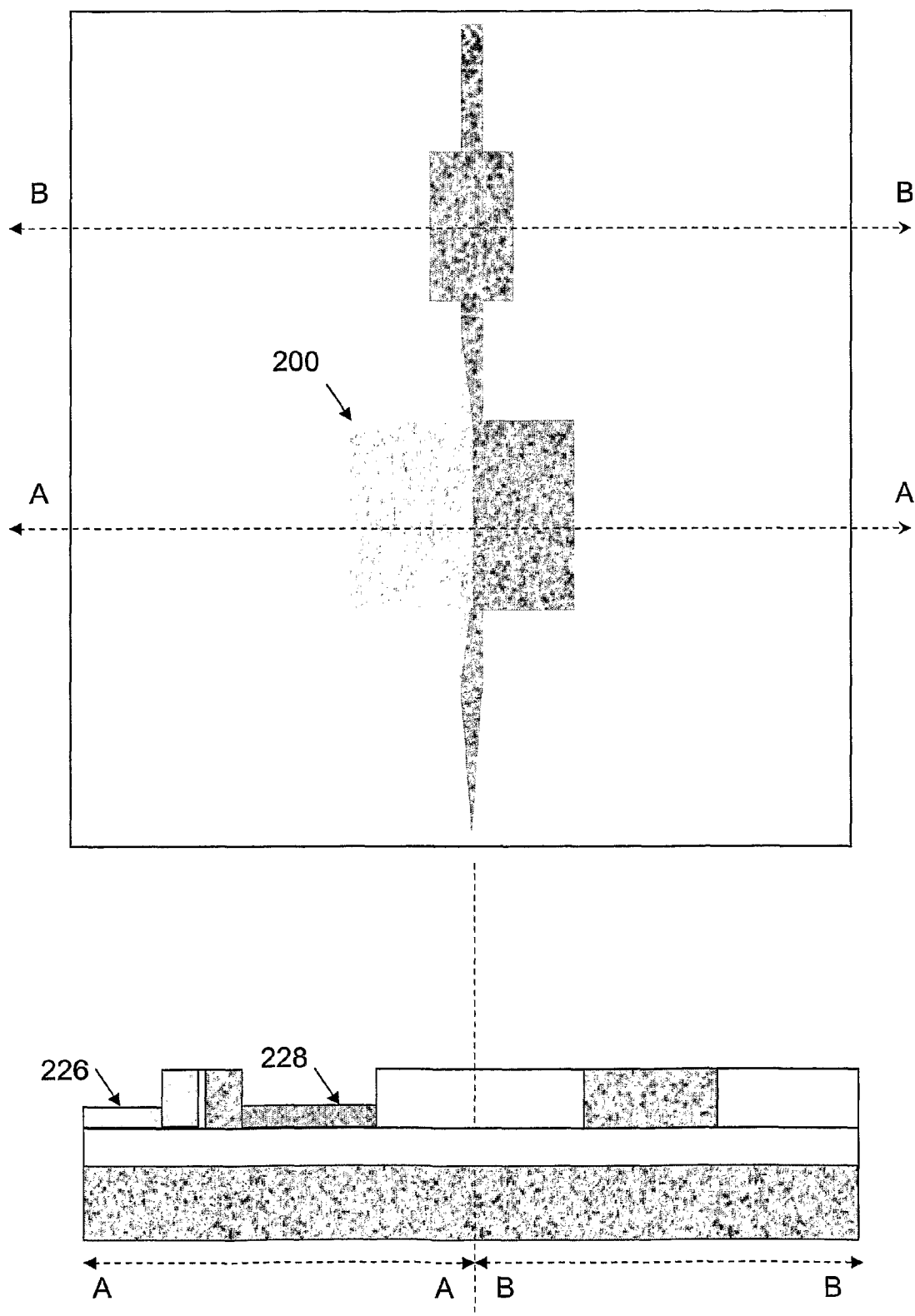
Figure 2K:
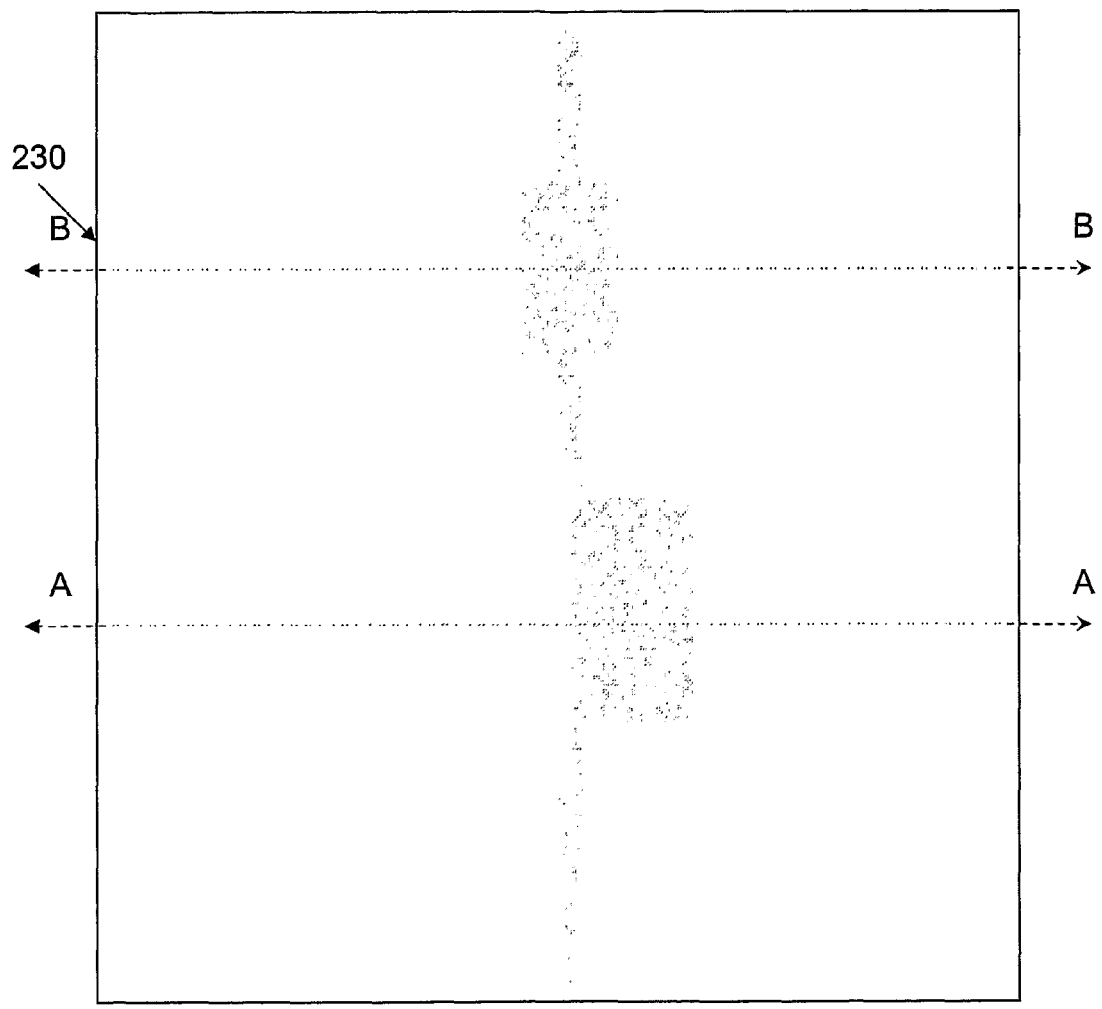
Figure 2K:
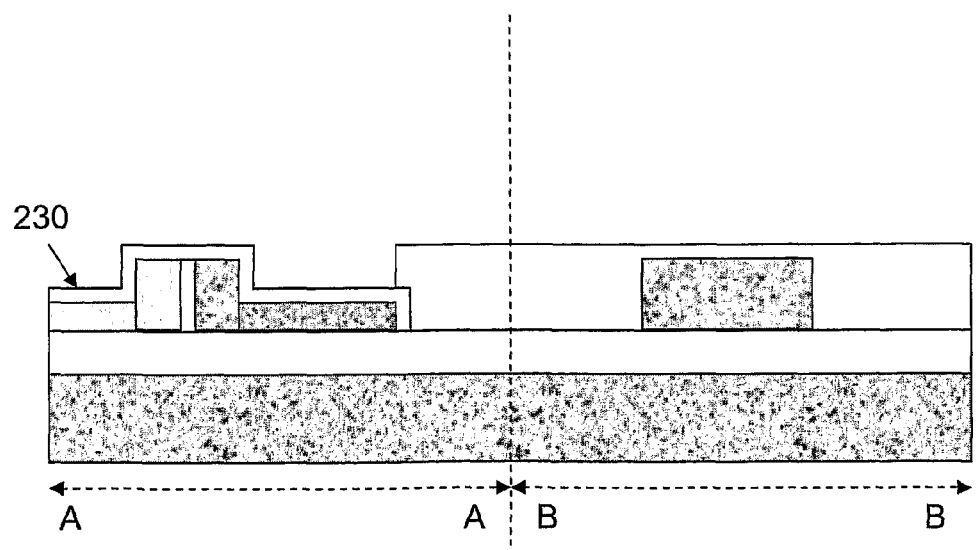
Figure 2L:
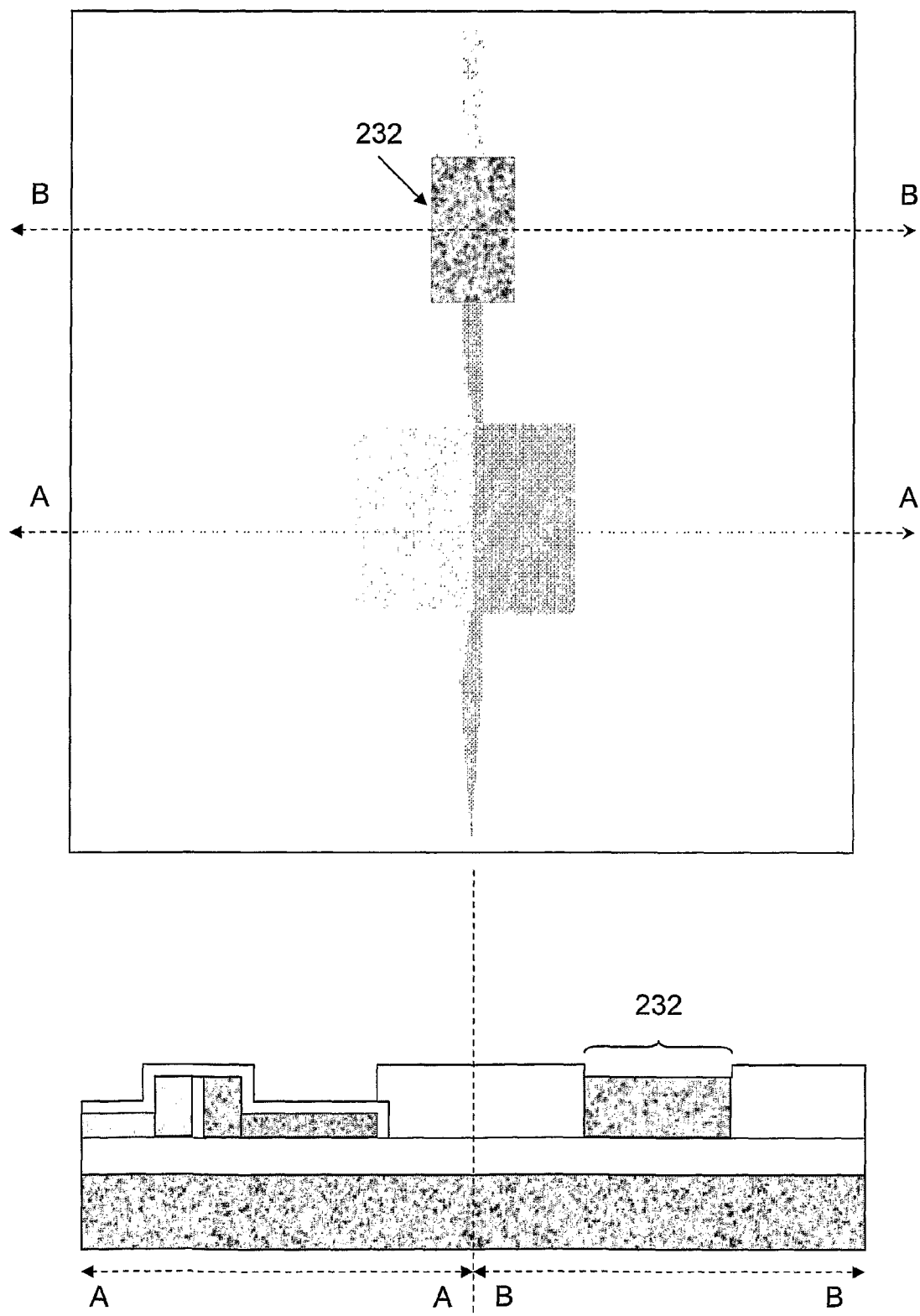
Figure 2M:
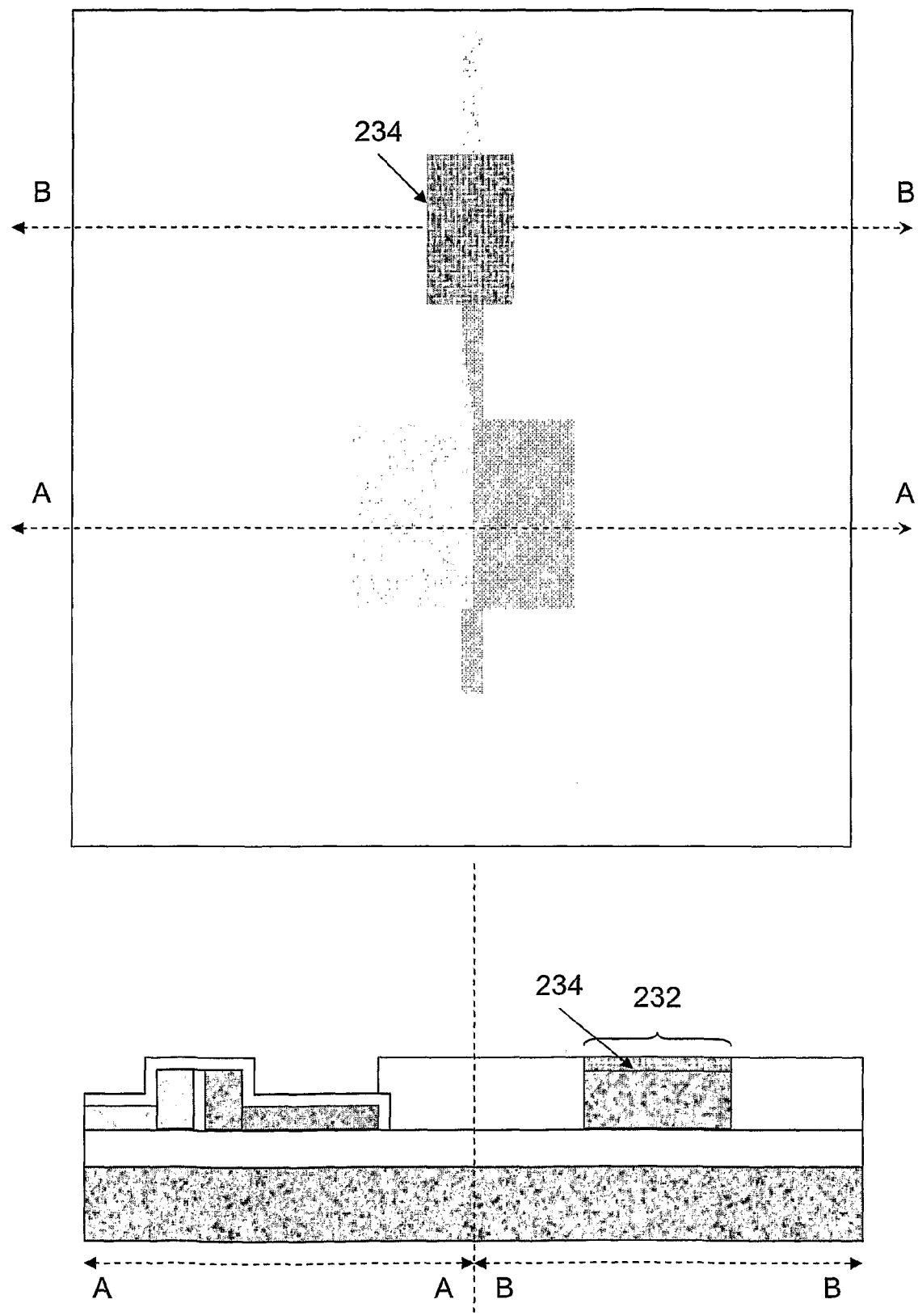
Figure 2N:
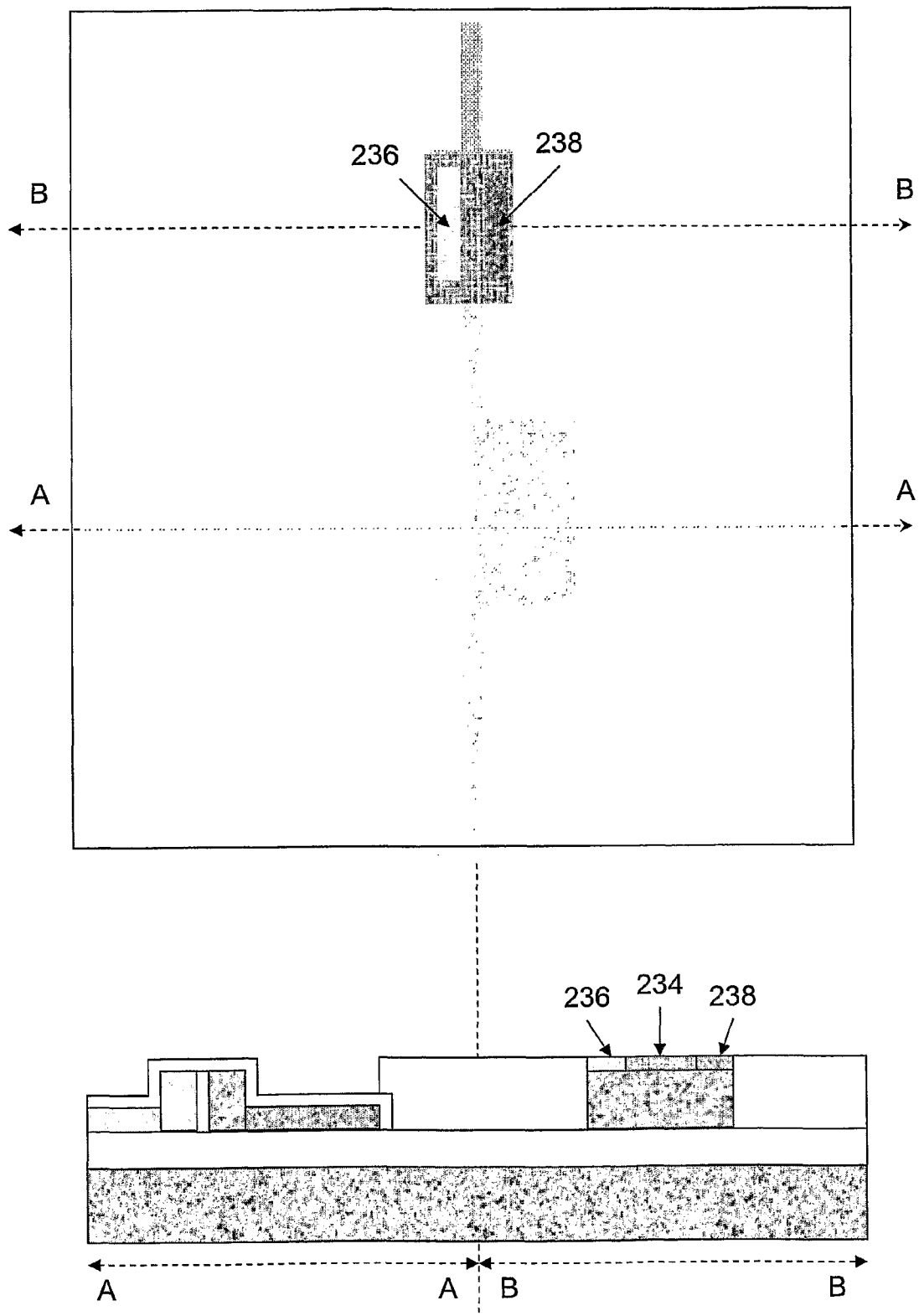
Figure 2O:
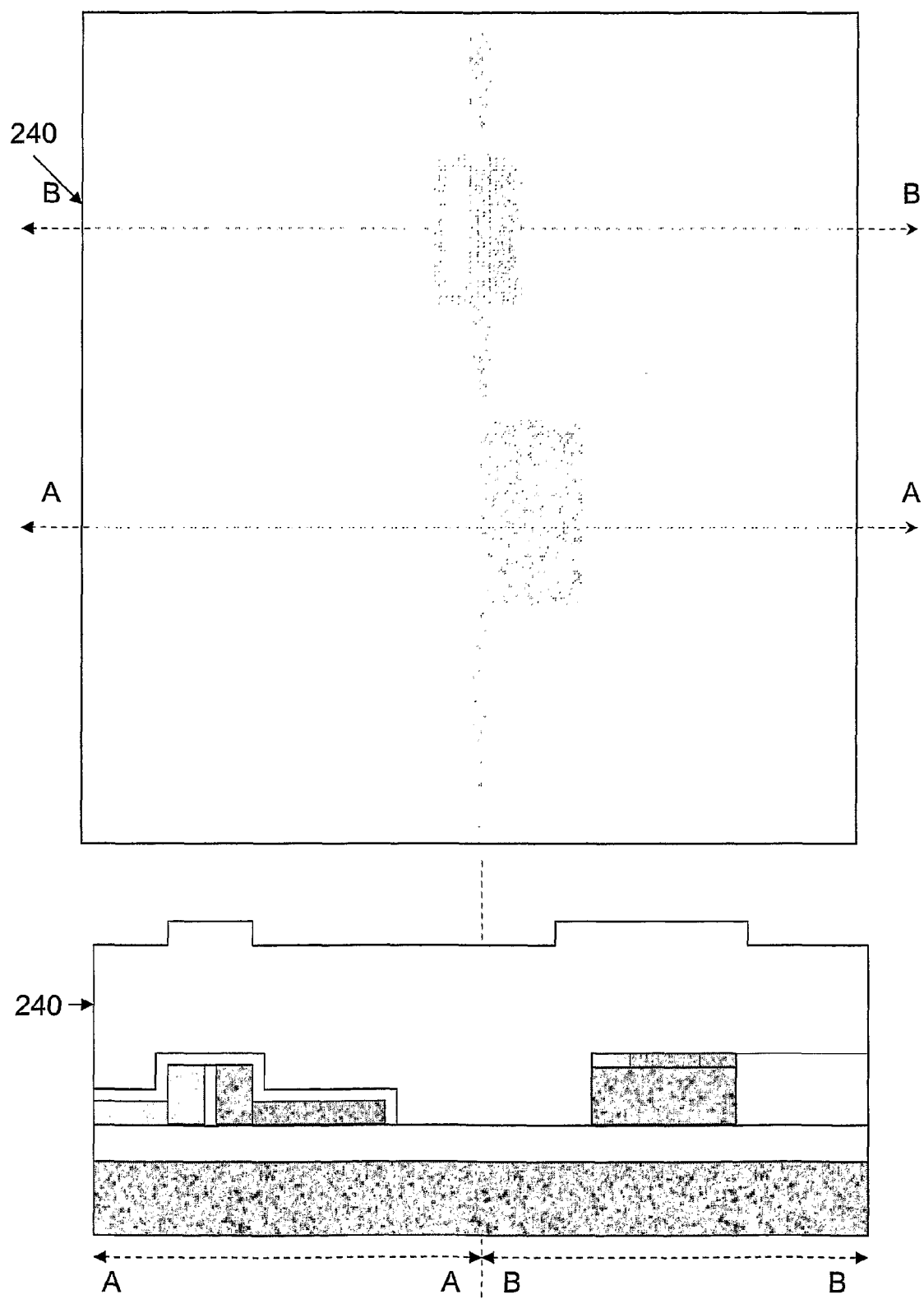
Figure 2P:
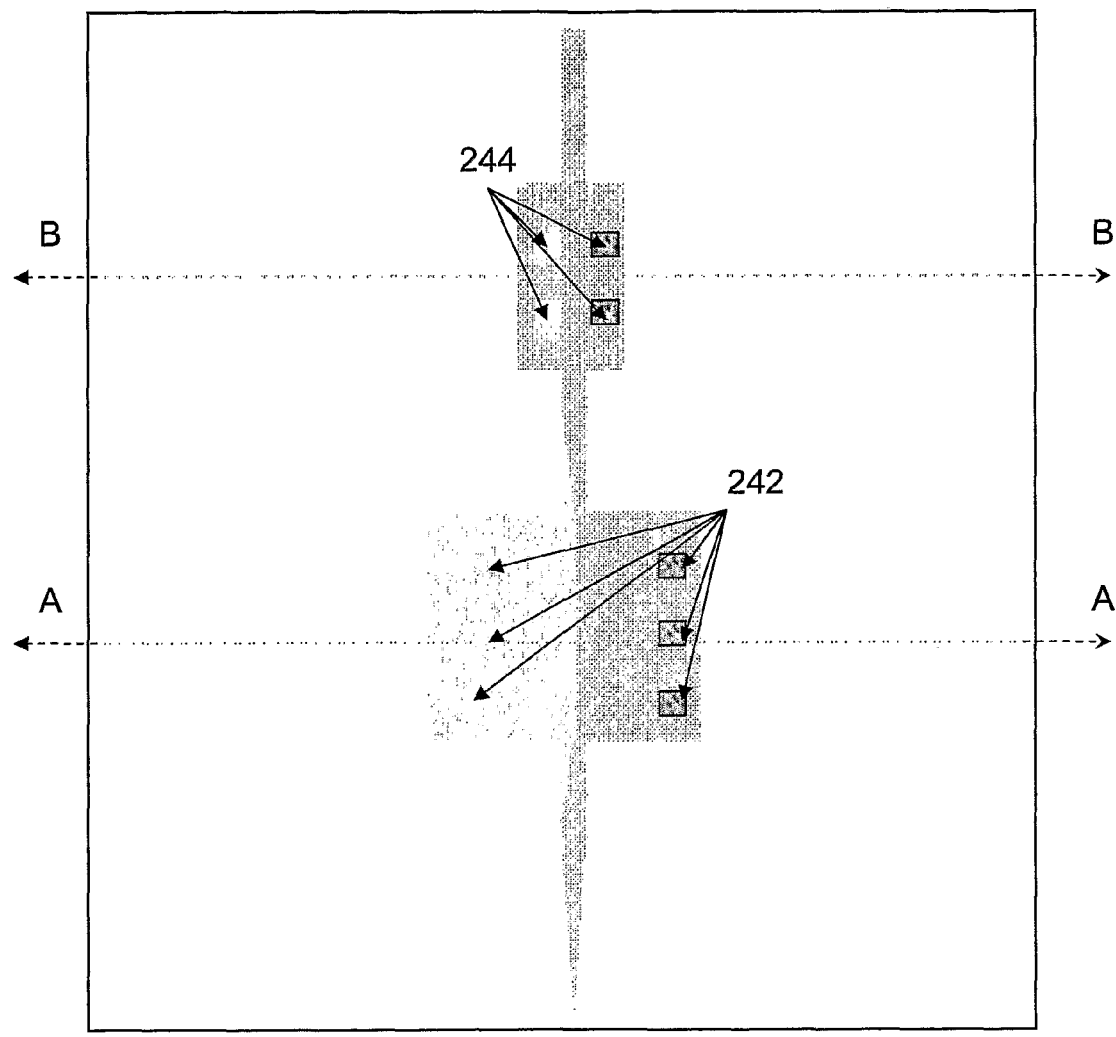
Figure 2P:
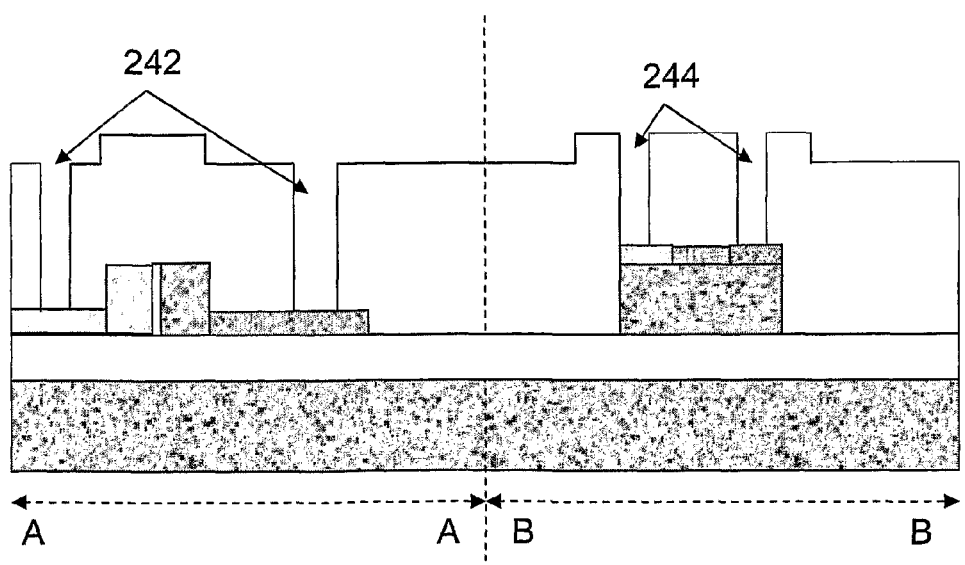
Figure 2Q:
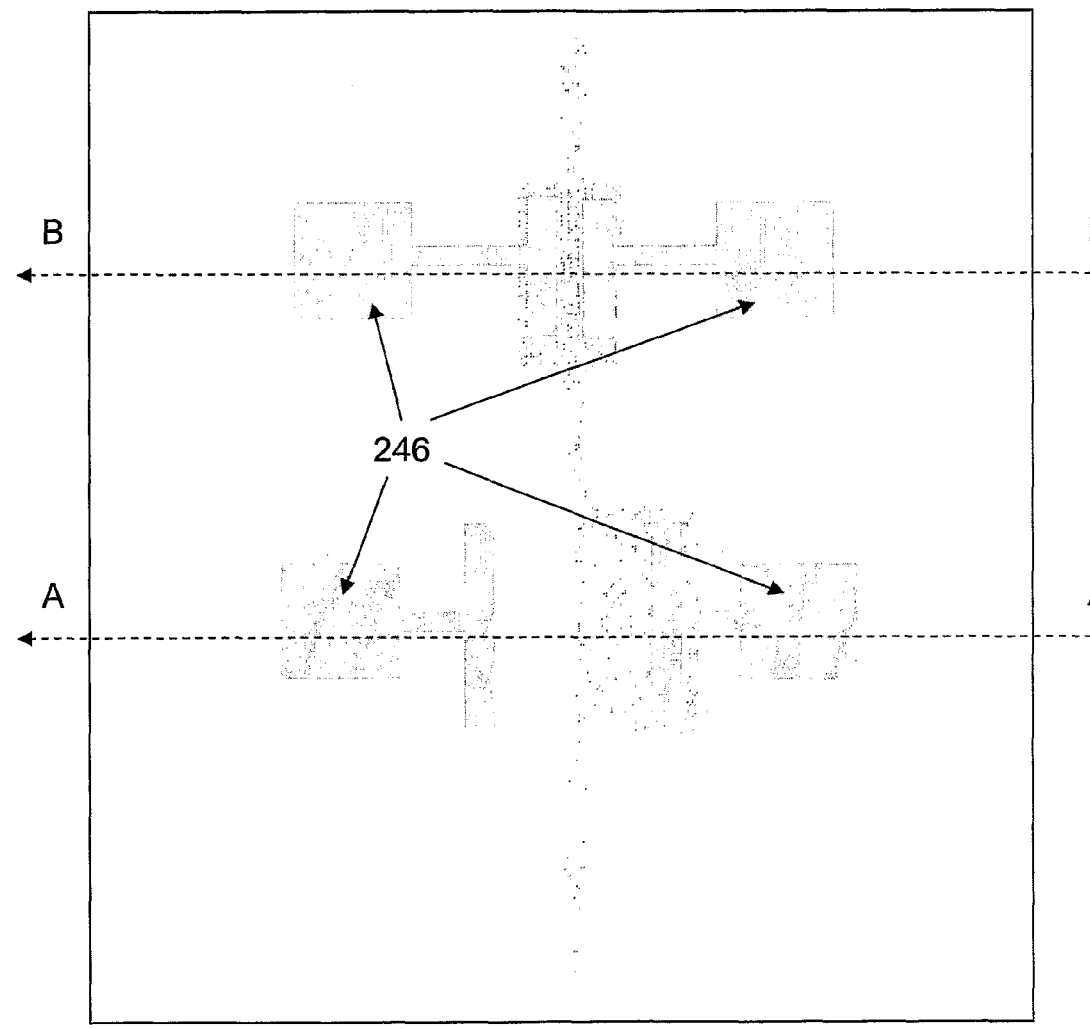
Figure 2Q:
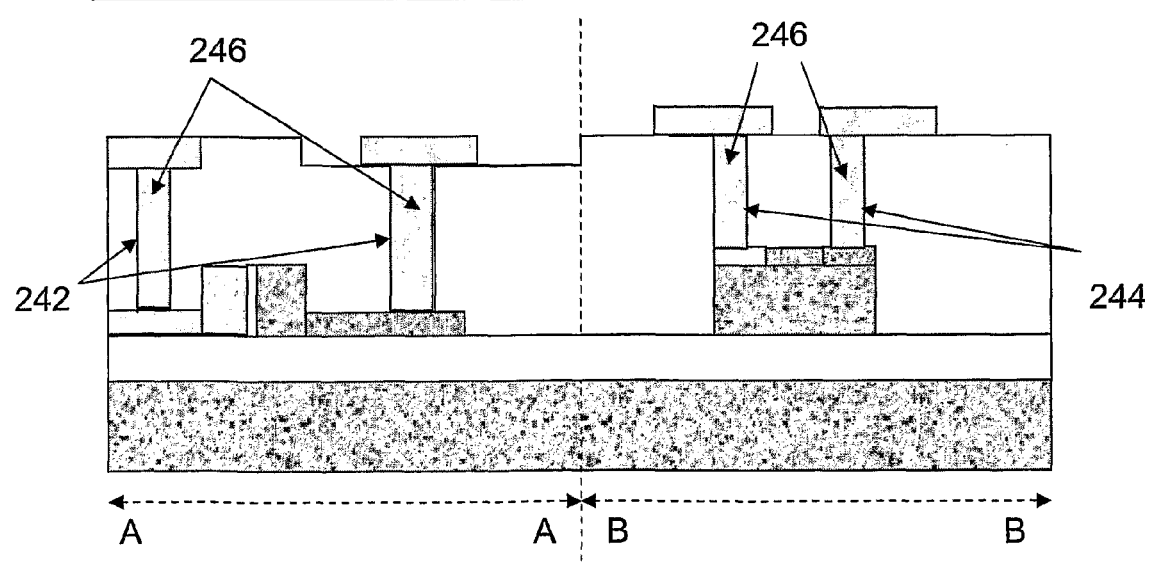

FIGS. 2A to 2Q show respective top and cross-sectional views illustrating processes for manufacturing an electro-optic device 200 and a photo-detector 202 in accordance with an embodiment of the invention when both devices are integrated.

FIG. 2A shows a starting semiconductor substrate 204. As an illustration, the starting semiconductor substrate 204 is a Silicon-On-Insulator (SOI) structure. The SOI structure 204 includes a semiconductor device layer 206 separated vertically from a support substrate 208 by a buried oxide (BOX) layer 210 or an insulating layer. The insulating layer 210 electrically isolates the device layer 206 from the support substrate 208. The SOI structure 204 may be fabricated by any standard techniques, such as wafer bonding or a separation by implantation of oxygen (SIMOX) technique.

In the illustrated embodiment of the invention in FIG. 2A, the device layer 206 is typically bulk Si but may be formed from any suitable semiconductor materials including, but not limited to poly-Si, gallium arsenide (GaAs), germanium (Ge) or silicon-germanium (SiGe). The thickness of the device layer 206 is typically in the range of about 2 nm to about 1 μm, but not so limited. The support substrate 208 may be formed from any suitable semiconductor materials including, but not limited to, Si, sapphire, polycrystalline silicon (polysilicon), SiO$_2$ or silicon nitride (Si$_3$N$_4$). The thickness of the support substrate 208 is typically in the range of about 500 µm to about 1000 µm. The thickness will be typical and decided by the size of the wafer. The insulating layer 210 is typically SiO$_2$, processed from tetraethylorthosilicate (TEOS), Silane (SiH$_4$) or thermal oxidation of Si, glass, silicon nitride (Si$_3$N$_4$) or silicon carbide. The thickness of the insulating layer 210 is typically in the range of about 500 A to about 5 µm, but not so limited. The thicker insulator is preferred for optical confinement for the light guided in the waveguide in above structure.

Next, FIG. 2B shows a dielectric layer 212 deposited on the semiconductor device layer 206. The dielectric layer 212 may be an oxide layer, for example SiO$_2$, about 100 Armstong, as pad oxide before hardmask layer deposition. Nevertheless, any other suitable insulating material can be used for the dielectric layer 212. Then the semiconductor device layer 206 is doped with a p-type dopant, for example boron (B) to render the semiconductor device layer 206 as p-type. Some examples of the boron implant dose are 6E12, 60 KeV; 4E12, 20 Kev; 3E12, 100 Kev respectively. Then after implant, there is an annealing step to activate the implants. This is followed by photoresist stripping (PRS) and wet clean.

Subsequently, FIG. 2C shows a Si$_3$N$_4$ hard mask layer 214 deposited on the dielectric layer 212. The Si$_3$N$_4$ hard mask layer 214 protects the dielectric layer 212 in subsequent etching steps.

From FIG. 2D to 2Q, a cross-section is made through the electro-optic device 200 along the line A-A and a cross-section is made through the photo-detector 202 along the line B-B.

In FIG. 2D, a photoresist layer (not shown) is deposited on the Si$_3$N$_4$ hard mask layer 214. The photoresist layer is then patterned to form a Si waveguide 216 by standard photolithography techniques. Subsequently, using the patterned photoresist layer as a mask, portions of the hard mask 214 not covered by the photoresist mask is etched away by an anisotropic etching process such as Reactive Ion Etching (RIE). Then, the dielectric layer and the Si device layer 206 are also etched to form a Si waveguide 216. This is followed by PRS and wet clean.

In FIG. 2E, an oxide layer 218, for example SiO$_2$ is thermally grown for vertical gate isolation layer to completely isolate between a poly-Si layer 220 to Si device layer 206. Next poly-Si 220 is deposited over the Si$_3$N$_4$ hard mask layer 214 and the insulating layer 210. The poly-Si 220 is subsequently doped with n-type dopants, which is of an opposite conductivity type of that of the doped Si device layer 206. The doping is done by implant or by diffusion. Some examples of n-type dopants are arsenic (As) and phosphorus (P).

In FIG. 2F, a photoresist layer (not shown) is deposited on the poly-Si layer 220. The photoresist layer is then patterned to form a poly-Si waveguide 222 by standard photolithography techniques. Subsequently, using the patterned photoresist layer as a mask, portions of the poly-Si 220 not covered by the mask is etched away by an anisotropic etching process such as RIE to form the poly-Si waveguide 222.

In FIG. 2G, a dielectric layer 224 is deposited over the poly-Si 220, Si$_3$N$_4$ 214 and insulating layer 210. The dielectric layer 224 is typically SiO$_2$ but not so limited.

Next in FIG. 2H, a photoresist layer (not shown) is deposited over the dielectric layer 224 and a Si waveguide reverse mask pattern is formed. Then the patterned photoresist as a mask, the dielectric layer 224 is etched and wet clean is performed.

In FIG. 2I, chemical mechanical polishing is performed on the poly-Si 220 layer such that about 500 Armstrong of Si$_3$N$_4$ 214 remained. Then the Si$_3$N$_4$ layer 214 is removed by wet clean.

In FIG. 2J, the N+ 226 and P+ 228 areas for the electro-optic device 200 or modulator are etched and the respective n-type and p-type dopants are implanted.

Then in FIG. 2K, a dielectric layer 230 is deposited for subsequent selective growth of Ge window for the photo-detector.

In FIG. 2L, the photo-detector Ge window 232 is opened. And in FIG. 2M, Ge epitaxy 234 is selectively grown in the photo-detector Ge window 232. Then in FIG. 2N, respective n-type and p-type dopants are implanted into the Ge epitaxy 234 to form the respective N+ 236 and P+ 238 areas. This is followed by annealing.

In FIG. 2O, a thick dielectric layer or isolation structure 240, for example SiO$_2$ is deposited for waveguide cladding. Then in FIG. 2P, the modulator contact hole 242 and photo-detector contact hole 244 are patterned. This is followed by etch and wet clean.

Finally in FIG. 2Q, metal layers 246 are deposited in the respective contact holes 242, 244. The metal layer 246 is typically titanium nitride (TiN) or aluminum (Al). Then the metal pad is patterned, such as the layer shown on top of the isolation structure 240. This is followed by etch and wet clean. Then it is completed.

Figure 3:
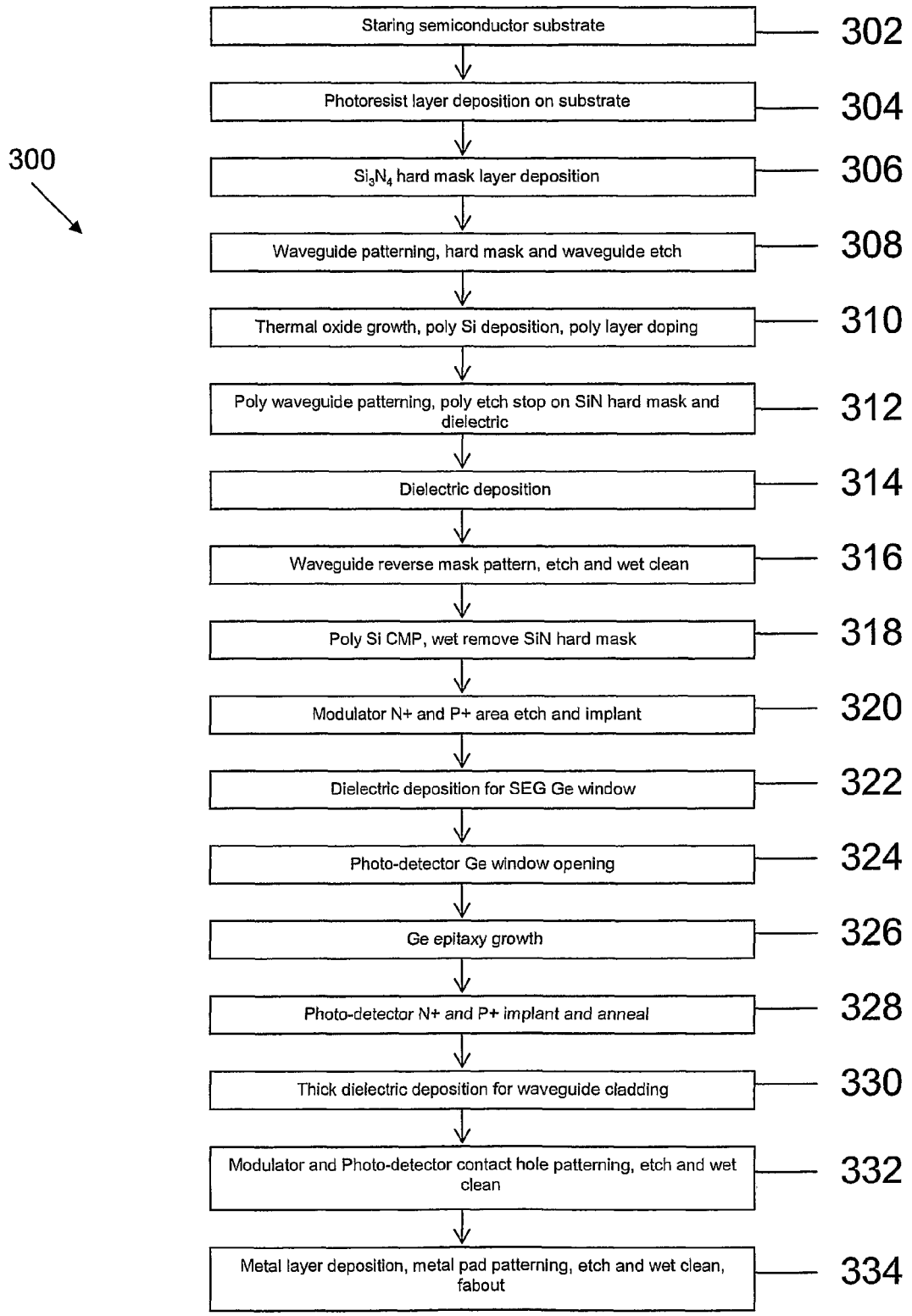
FIG. 3 shows a flow diagram illustrating a method for manufacturing an electro-optic device in accordance with an embodiment of the invention.

FIG. 3 shows a flow diagram illustrating a method for manufacturing an electro-optic device in accordance with an embodiment of the invention. The method 300 begins at 302 with a starting semiconductor substrate 204. Next, in 304, a dielectric layer 212 is deposited on the semiconductor substrate 204. Further, in 306, a Si$_3$N$_4$ hard mask layer 214 is deposited on the dielectric layer 212. Then in 308, a photoresist layer is deposited on the Si$_3$N$_4$ hard mask 214. The photoresist layer is patterned using photolithography techniques to form a Si waveguide pattern. Using the patterned photoresist as a mask, portions of the Si$_3$N$_4$ hard mask 214 not covered by the photoresist mask is etched away. Then, the dielectric layer 212 and the Si device layer 206 are also etched to form a Si waveguide 216. This is followed by PRS and wet clean. Then in 310, oxide 218 is thermally grown, followed by poly-Si 220 deposition and poly-Si layer doping. In 312, the poly-Si waveguide pattern 222 is formed and poly etch stop is deposited on Si$_3$N$_4$ hard mask 214 and dielectric layer 210. In 314, a further dielectric layer 224 is deposited. Then in 316, waveguide reverse mask is patterned on the dielectric layer 224. This is followed by etch and wet clean. In 318, CMP is performed on the poly-Si 220 and the Si$_3$N$_4$ hard mask 214 is wet removed. In 320, the electro-optic modulator N+ 226 and P+ 228 areas are etch and implanted with respective n-type and p-type doping atoms. In 322, a dielectric layer 230 is deposited for SEG Ge window. In 324, this is followed by photo-detector Ge window opening 232. Then in 326, Ge epitaxy 234 is grown in the photo-detector Ge window opening 232. Then in 328, respective n-type and p-type doping atoms are implanted into the photo-detector N+ 236 and P+ 238 areas. This is followed by annealing. In 330, a thick dielectric layer 240 is deposited for waveguide cladding. Then in 332, the modulator 242 and photo-detector 244 contact holes are patterned, then etched and wet clean. Finally in 334, metal layers 246 are deposited into the respective contact holes 242, 244. This is followed by metal pad pattern, etch and wet clean. It is then completed.

FIG. 4A to 4D show respective cross-sectional views of an electro-optic device with different doping schemes in accordance with an embodiment of the invention. The first semiconducting partial active region 402 comprises a first doped region 406 and a second doped region 408 and the second semiconducting partial active region 404 comprises a first doped region 410 and a second doped region 412. The first doped regions 406, 410 are defined as the vertically elongated regions adjacent the insulating structure and the second doped regions 408, 412 are defined as the horizontally elongated regions nearer to the respective first semiconducting region 414 and second semiconducting region 416.

The first doped regions 406, 410 of the respective first 402 and second 404 semiconducting partial active regions typically has a height similar to the height of the first 402 and second 404 semiconducting partial active regions. The height is typically in the range from 100 to 500 A. The first doped regions 406, 410 of the respective first 402 and second 404 semiconducting partial active regions has a thickness extending in the direction out from the insulating structure 418 or width typically in the range from about 0 nm to 300 nm.

The second doped regions 408, 412 of the respective first 402 and second 404 semiconducting partial active regions typically has a height similar to the height of the first 414 and second 416 semiconducting regions. The height is typically in the range from 250 A to 1000 A. In addition, the second doped regions 408, 412 of the respective first 402 and second 404 semiconducting partial active regions typically has a thickness extending in the direction from the insulating structure 418 or width similar to the width of the respective first 402 and second 404 semiconducting partial active regions. The width of the second doped regions 408, 412 of the respective first 402 and second 404 semiconducting partial active regions is typically in the range from 0 to 3000 A.

Figure 4:
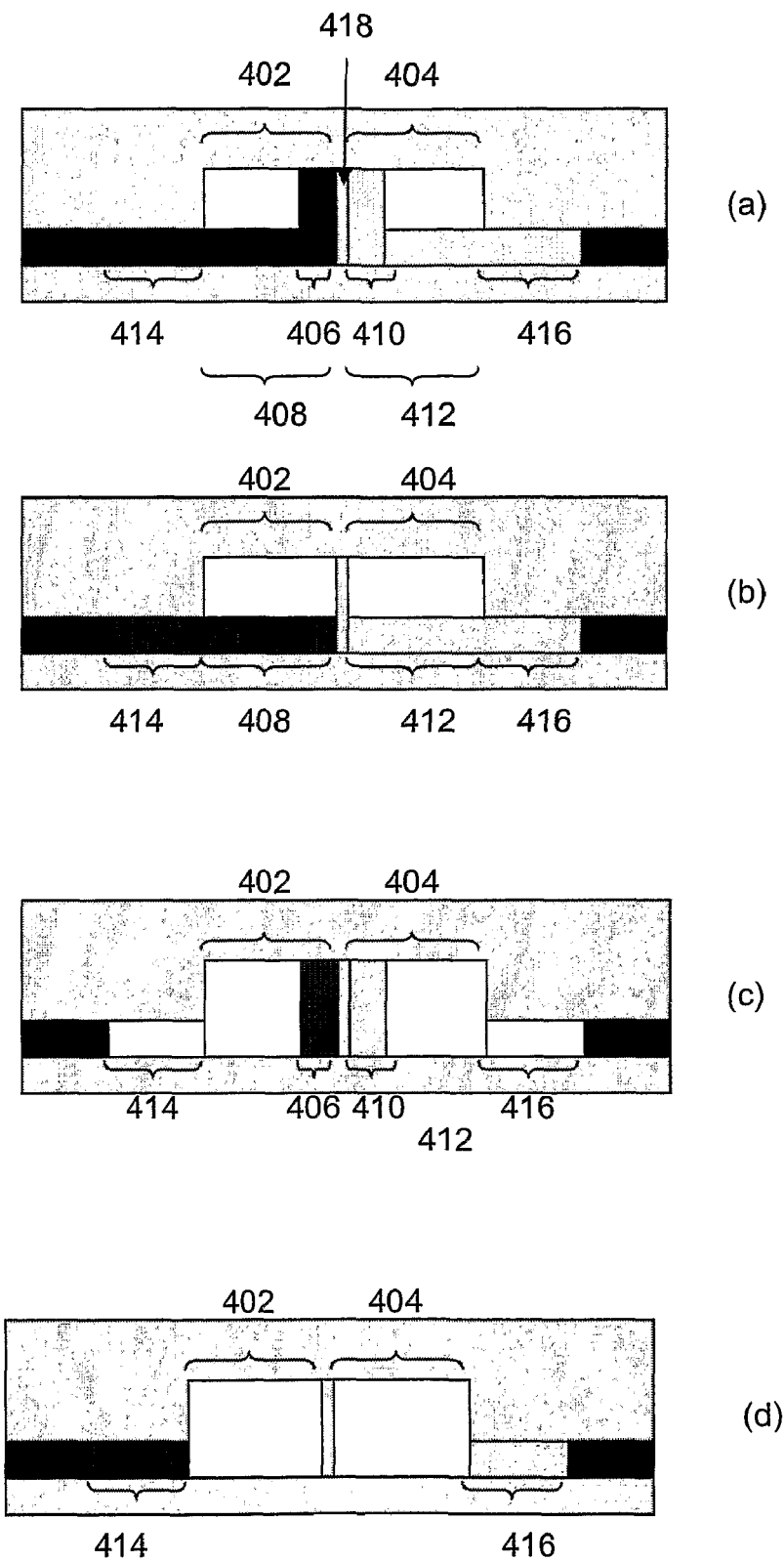
FIG. 4A to 4D show respective cross-sectional views of an electro-optic device with different doping schemes in accordance with an embodiment of the invention.

FIG. 4A shows that a portion of the first doped region 406 and a portion of the second doped region 408 of the first semiconducting partial active region 402 overlaps at an intersection. Similarly a portion of the first doped region 410 and a portion of the second doped region 412 of the second semiconducting partial active region 404 overlaps at the intersection.

The doping concentration of the first doped region 406 and the second doped region 408 of the first semiconducting partial active region 402 is higher than the doping concentration of the remaining region of the first semiconducting partial active region 402. Similarly, the doping concentration of the first doped region 410 and the second doped region 412 of the second semiconducting partial active region 404 is higher than the doping concentration of the remaining region of the second semiconducting partial active region 404.

The first doped region 406 and the second doped region 408 of the first semiconducting partial active region 402 are of the same doping concentration as the first semiconducting region 414. Similarly, the first doped region 410 and the second doped region 412 of the second semiconducting partial active region 404 are of the same doping concentration as the second semiconducting region 416.

The doping concentration of the first doped region 406, second doped region 408 of the first semiconducting partial active region 402 and the first semiconducting region 414 is similar to the doping concentration of the first doped region 410, second doped region 412 of the second semiconducting partial active region 404 and the second semiconducting region 416. The purpose of high doping is to reduce the contact resistances and layer resistances.

The doping concentration in the first doped region 406, second doped region 408 of the first semiconducting partial active region 402 and the first semiconducting region 414 is in the range from about $10^{19}$ cm$^{-3}$ to $10^{29}$ cm$^{-3}$. The doping concentration in the first doped region 410, second doped region 412 of the second semiconducting partial active region 404 and the second semiconducting region 416 is in the range from about $10^{17}$ cm$^{-3}$ to $10^{19}$ cm$^{-3}$. The doped regions 406, 408, 410, 412 provide a low resistance path for faster carrier flow in and out from contacts to the first semiconducting partial active region 402 and the second semiconducting partial active region 404 and a richer reservoir of carrier source from the body (i.e., the regions adjacent to the vertical dielectric, 418) for higher accumulated carrier concentration at the SiO$_2$ interface and hence better phase change.

FIG. 4B shows that the doping concentration of the second doped region 408 of the first semiconducting partial active region 402 is higher than the doping concentration of the remaining region of the first semiconducting partial active region 402. Similarly, the doping concentration of the second doped region 412 of the second semiconducting partial active region 404 is higher than the doping concentration of the remaining region of the second semiconducting partial active region 404.

The second doped region 408 of the first semiconducting partial active region 402 is of the same doping concentration as the first semiconducting region 414. Similarly, the second doped region 412 of the second semiconducting partial active region 404 is of the same doping concentration as the second semiconducting region 416. Different doping can be used, and subjected to specific optimization. Graded concentration profile laterally can also be introduced as to optimize the resistance as well as minimizing the dopants impact on propagation loss for light traveling within first semiconducting partial active region 402/insulating structure 418/second semiconducting partial active region 404.

The doping concentration of the second doped region 408 of the first semiconducting partial active region 402 and the first semiconducting region 414 is similar to the doping concentration of the second doped region 412 of the second semiconducting partial active region 404 and the second semiconducting region 416.

The doping concentration in the second doped region 408 of the first semiconducting partial active region 402 and the first semiconducting region 414 is in the range from about $10^{16}$ cm$^{-3}$ to $10^{20}$ cm$^{-3}$. The doping concentration in the second doped region 412 of the second semiconducting partial active region 404 and the second semiconducting region 416 is in the range from about $10^{16}$ cm$^{-3}$ to $10^{20}$ cm$^{-3}$.

FIG. 4C shows that the doping concentration of the first doped region 406 of the first semiconducting partial active region 402 is higher than the doping concentration of the remaining region of the first semiconducting partial active region 402. Similarly, the doping concentration of the first doped region 410 of the second semiconducting partial active region 404 is higher than the doping concentration of the remaining region of the second semiconducting partial active region 404.

The remaining region of the first semiconducting partial active region 402 is of the same doping concentration as the first semiconducting region 414. Similarly, the remaining region of the second semiconducting partial active region 404 is of the same doping concentration as the second semiconducting region 416.

The doping concentration of the first doped region 406 of the first semiconducting partial active region 402 is similar but can be different from the doping concentration of the first doped region 410 of the second semiconducting partial active region 404.

The doping concentration in the first doped region 406 of the first semiconducting partial active region 402 is in the range from about $10^{16}$ cm$^{-3}$ to $10^{20}$ cm$^{-3}$. The doping concentration in the first doped region 410 of the second semiconducting partial active region 404 is in the range from about $10^{19}$ cm$^{-3}$ to $10^{20}$ cm$^{-3}$.

FIG. 4D shows that the doping concentration of the first semiconducting region 414 is higher than the doping concentration of the first semiconducting partial active region 402. Similarly, the doping concentration of the second semiconducting region 416 is higher than the doping concentration of the second semiconducting partial active region 404.

Results

A 2-D electrical simulation package, Avant! MEDICI, is employed to simulate the electrical characteristics in the waveguide with any applied bias. The proposed electro-optic device or modulator is intended to be operating in pure depletion mode. The device simulation suggests that the flatband voltage is VFB=0.93V. With silicon and oxide dielectric having respective breakdown electric fields of about 3.0e5 Vcm$^{-1}$ and 5.5e6 Vcm$^{-1}$, simulation suggests that minimum Vd is 0.15 V in depletion mode, being limited by the Si breakdown effect.

Figure 5:
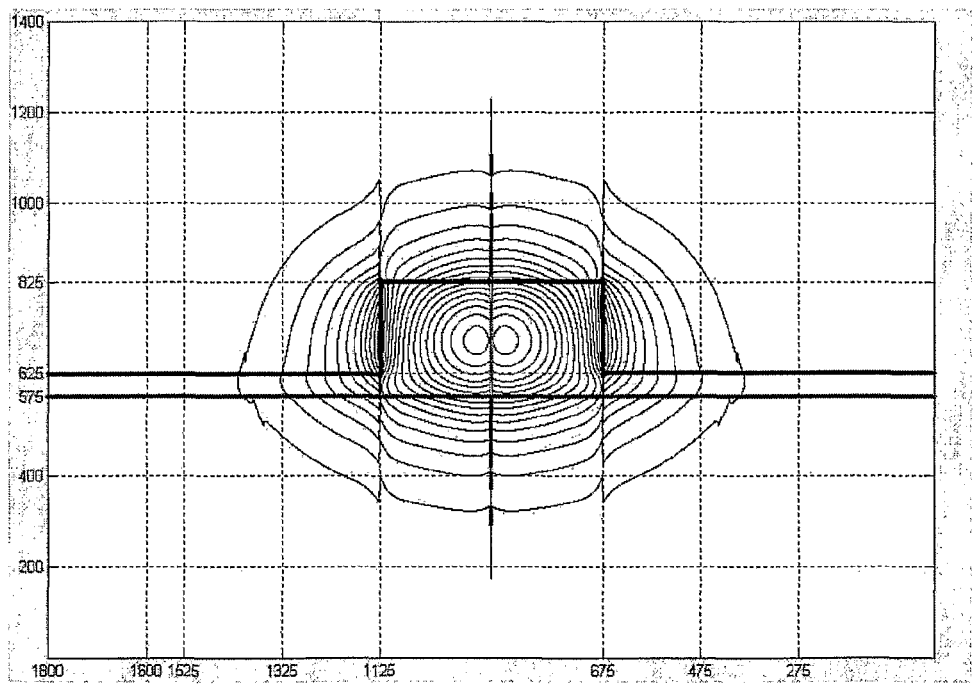
FIG. 5 shows a transverse electric (TE) optical intensity plot for an electro-optic device in accordance with an embodiment of the invention.

FIG. 5 shows a transverse electric (TE) optical intensity plot 500 for an electro-optic device in accordance with an embodiment of the invention. The localized doping pattern causes the highly-doped strips to overlap with thin portions of the highest optical intensity regions beside the dielectric layer. While higher doping concentration can induce higher speed performance and better phase efficiency, carrier absorption loss would be amplified. A three-fold analysis comprising transient speed, phase efficiency and loss analysis was done and an optimized strip thickness of about 25 nm was adopted beside the dielectric layer.

Figure 6:
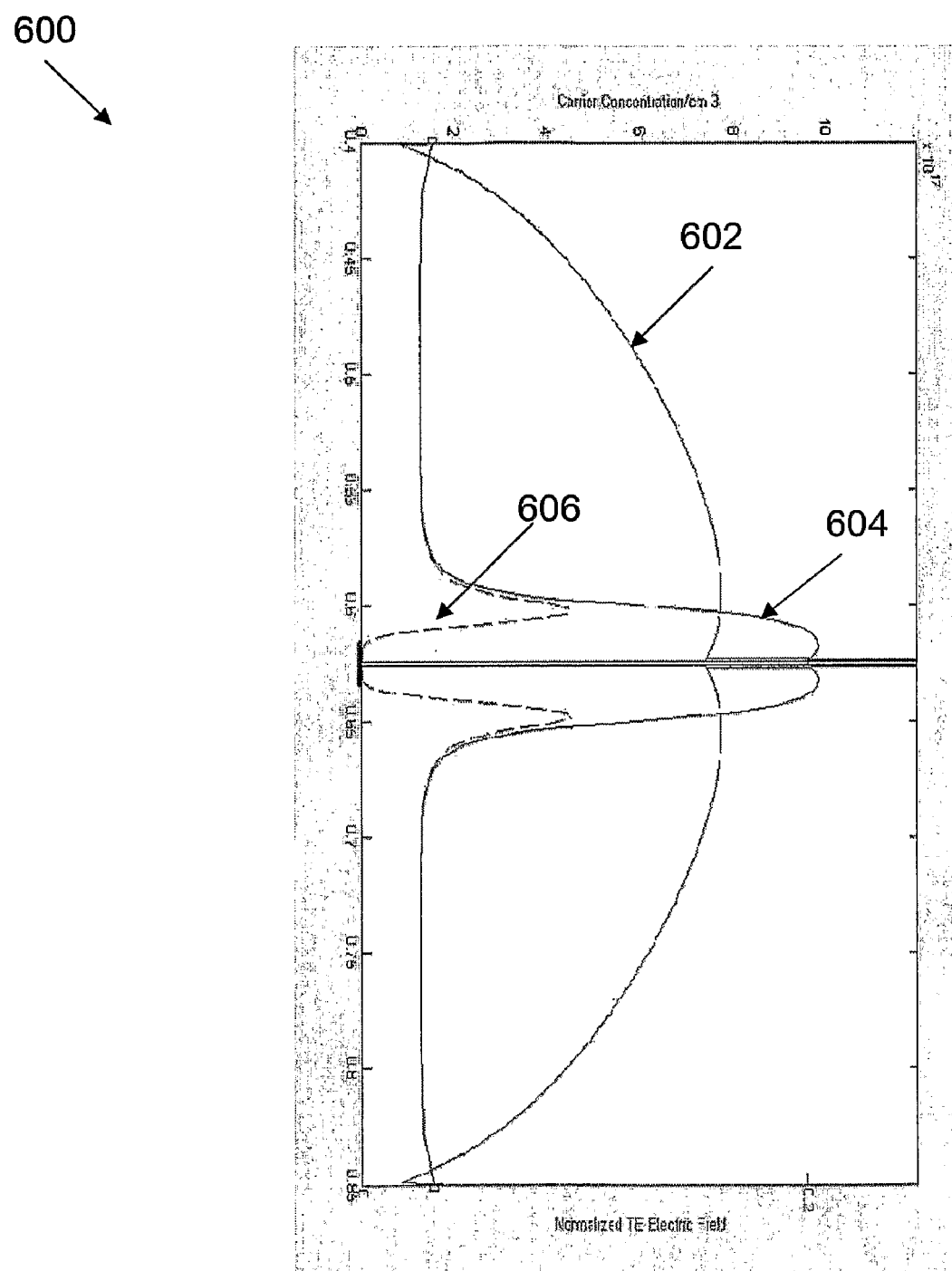
FIG. 6 shows a plot of optical mode distribution profile vs carrier accumulation and depletion when a horizontal cut is made at the middle of the rib height in accordance in accordance with an embodiment of the invention.

FIG. 6 shows a plot of optical mode distribution profile vs carrier accumulation and depletion 600 when a horizontal cut is made at the middle of the rib height in accordance with an embodiment of the invention. The rib waveguide core has a width of about 0.45 μm. The optical mode distribution is represented by curve 602. The direct-current (DC) carrier accumulation profile at Vd=VFB=0.93V is represented by curve 604. The carrier crests near the oxide edges are due to the highly-doped strips adopted in the doping scheme of FIG. 4D. Because of the narrow effective carrier modulation region, the carriers are accumulated mainly towards to the oxide edge.

The carrier depletion profile at Vd=0.15V is represented by curve 606. At Vd=0.15V, holes on the left side and electrons on the right side are depleted, forming troughs near the oxide edges. This is evident of carrier modulation taking place near the regions of highest optical intensity. In FIG. 6, the highest TE electric field regions coincide with the vertical oxide location.

Figure 7:
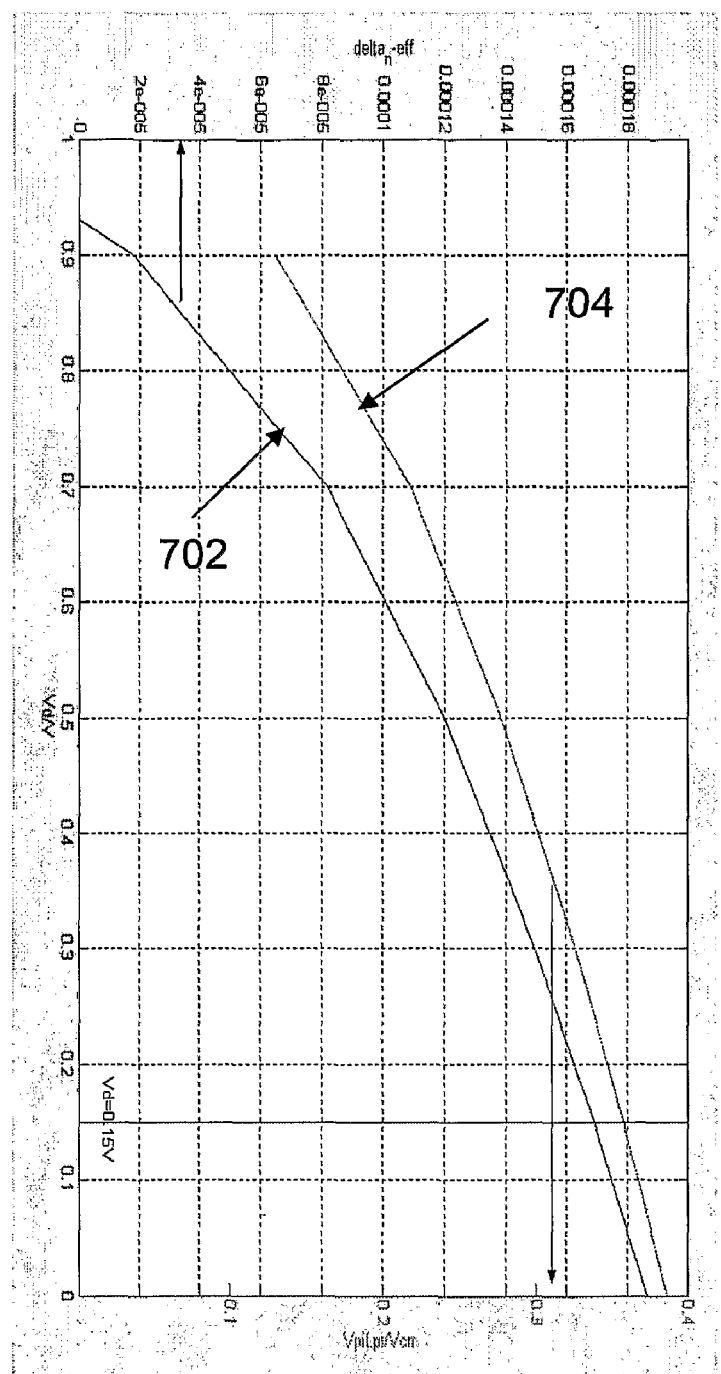
FIG. 7 shows a plot of change in efficiency and $V\pi L\pi$ vs Vd in accordance with an embodiment of the invention.

FIG. 7 shows a plot of change in efficiency and VπLπ vs Vd in accordance with an embodiment of the invention. The change in efficiency vs Vd is represented by curve 702 and the VπLπ vs Vd is represented by 704. In FIG. 7, VπLπ figure-of-merit value is about 0.36 Vcm (definition of Lp or Vp means the length of the light travels in waveguide under Bias of Vp to achieve total phase shift of Pi, so the light interfaces at the output of the MZI will cancel as to generate Signal −0), with Vπ=Vd−VFB. The VπLπ value suggests that for a modulating signal of about 0.78 Vpp, the device length Lπ is only about 4.5 mm long (light intensity from Highest to the Lowest at the output of MZI structure). In FIG. 7, it is shown that the VπLπ value increases with increasing |Vd−VFB|.

Hence it is possible to improve this figure of merit to as low as about 0.1 Vcm at Vd of about 0.8V, although transmission loss will be very high. The DC loss at Vd=0.15V, is calculated to be about 11 dB/Lπ (per Lπ). Out of 11 dB/Lπ, polysilicon loss accounts for about 6.7 dB/Lπ, representing about 60% of the DC loss. This is under the assumption that polysilicon has a loss rate of about 50 dB/cm. It is therefore clear that reducing the polysilicon loss will be essential in significantly improving the transmission loss. It is possible to reduce this value further by replacing the polysilicon with single crystalline silicon, with the potential total loss to be reduced to less than about 5 dB/Lπ. The voltage-dependent loss (VDL) per Lπ at Vd=0.15V is simulated to be about −1.5 dB/Lπ, negative due to the carriers withdrawal effect. Since this value is small compared to the DC loss, the key in loss reduction is still either in improving the quality of or replacing the poly-Si.

In order to simulate the structure's transient response, a square pulse of Von=0.15V and Voff=VFB=0.93V is applied on the p-side electrode, keeping the n-side electrode grounded. A 100 ps time gap between the step rise and step fall process induces a pseudo 1/(2*100 ps)=5 GHz signal, more than 1 MHz to ensure that inversion do not occur. A transient rise time of Tr (10-90%)=4 ps and Tf (10-90%)= 13.5 ps is obtained, where Tr and Tf represents the rise and fall time respectively. The 3-dB modulation bandwidth is then obtained from equation (1) as shown. The intrinsic cut-off bandwidth is calculated to be 40 GHz.

$$F_{3\,dB} = \frac{0.70}{Tr(10-90\%) + Tf(90-10\%)} [20] \quad (1)$$

A MOS-based device offers the advantage of zero DC power. Power is consumed only during the switching process and the largest theoretical AC power occurs at the lowest resistance state. Since depletion regions will contribute to depletion capacitance but not resistance, the strongest depletion state will have the lowest resistance. At Vd=0.15V where resistance is calculated to be about 2.74e3 Ω·um, and taking Vpp=2*Vss=0.93 V−0.15 V, the largest theoretical AC power can be determined to be Pac=½*Vss2/Rlowest=½*(½* (0.93V−0.15V))2/(2.74e3 Ω·um)=2.7755e-5 W/um. For a phase-shifting length Lπ of about 4.5 mm, the maximum theoretical Pac is approximately 0.125 W.

Figure 8A:
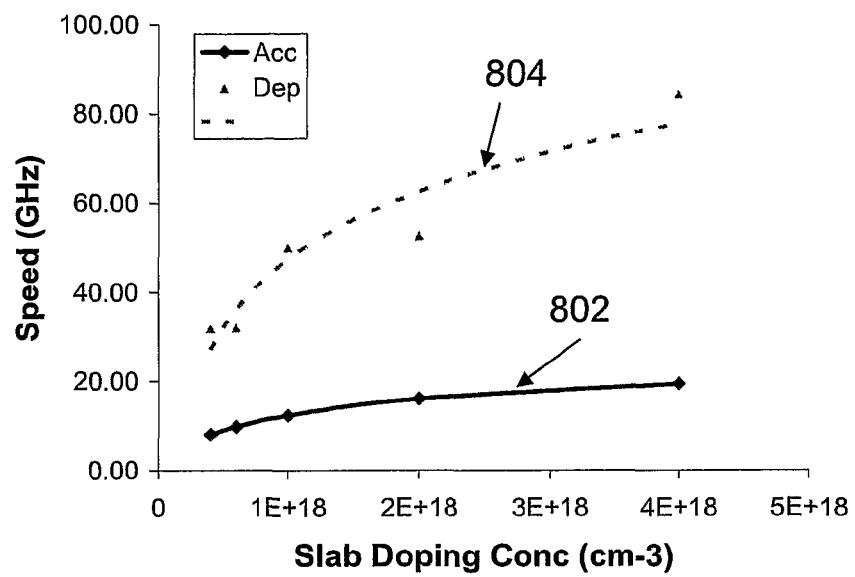
FIG. 8A shows a plot of speed vs slab doping concentration in accordance with an embodiment of the invention.

FIG. 8A shows a plot of speed vs slab doping concentration in accordance with an embodiment of the invention. The speed vs slab concentration for carrier accumulation is represented by curve 802 and for carrier depletion is represented by curve 804. The respective curves 802 and 804 indicate that by carrier depletion mode, the device is capable to have very high speed, up to 80 GHz or above, but with accumulation mode, >20 GHz is still achievable. The high speed from depletion is generally understood to be due to lower total effective capacitance from the extra serial mode depletion capacitance.

Figure 8B:
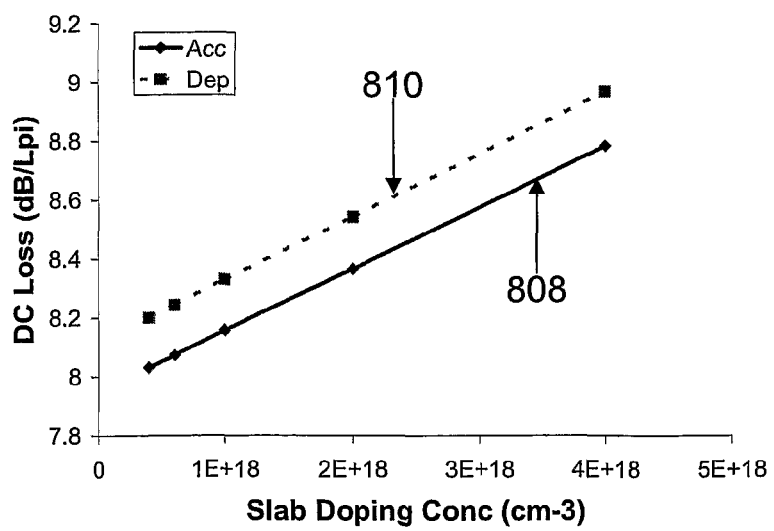
FIG. 8B shows a plot of DC loss vs slab doping concentration in accordance with an embodiment of the invention.

FIG. 8B shows a plot of DC loss vs slab doping concentration in accordance with an embodiment of the invention. The DC loss vs slab concentration for carrier accumulation is represented by curve 808 and for carrier depletion is represented by curve 810. FIG. 8B represents the trade off between higher speed performance at the expense of high loss from dopant carrier absorption mechanism.

What is claimed is:

1. An electro-optic device, comprising:
an insulating layer;
a first semiconducting region disposed above the insulating layer and being doped with doping atoms of a first conductivity type;
a second semiconducting region disposed above the insulating layer and being doped with doping atoms of a second conductivity type; and
an electro-optic active region disposed above the insulating layer and between the first semiconducting region and the second semiconducting region, the electro-optic active region comprising:
a first semiconducting partial active region being doped with doping atoms of the first conductivity type;
a second semiconducting partial active region being doped with doping atoms of the second conductivity type; wherein the material the first semiconducting partial active region is made of is different from the material the second semiconducting partial active region is made of; and
an insulating structure between the first semiconducting partial active region and the second semiconducting partial active region, wherein the insulating structure extends perpendicular to the surface of the insulating layer such that there is no overlap of the first semiconducting partial active region and the second semiconducting partial active region in the direction perpendicular to the surface of the insulating layer.

2. The electro-optic device of claim 1, wherein the first semiconducting partial active region is made of any material selected from the group consisting of bulk silicon, gallium arsenide (GaAs), germanium (Ge) and silicon-germanium (SiGe).

3. The electro-optic device of claim 1, wherein the insulating layer is an oxide layer.

4. The electro-optic device of claim 1, wherein the first semiconducting region is made of silicon.

5. The electro-optic device of claim 1, wherein the second semiconducting region is made of poly-silicon.

6. The electro-optic device of claim 1, wherein the first conductivity type is a p-conductivity type.

7. The electro-optic device of claim 1, wherein the second conductivity type is an n-conductivity type.

8. The electro-optic device of claim 1, wherein the electro-optic active region has a rib-shape with a larger height than the first semiconducting region and the second semiconducting region relative to the surface of the insulating layer.

9. The electro-optic device of claim 1, wherein the first semiconducting partial active region is in electrical contact with the first semiconducting region.

10. The electro-optic device of claim 1, wherein the second semiconducting partial active region is in electrical contact with the second semiconducting region.

11. The electro-optic device of claim 1, wherein the first semiconducting partial active region is made of silicon.

12. The electro-optic device of claim 1, wherein the second semiconducting partial active region is made of poly-silicon.

13. The electro-optic device of claim 1, wherein the first semiconducting partial active region comprises a first doped region and a second doped region, the first doped region having a doping concentration that is essentially the same as the doping concentration of the second doped region.

14. The electro-optic device of claim 1, wherein the second semiconducting partial active region comprises a first doped region and a second doped region, the first doped region having a doping concentration that is essentially the same as the doping concentration of the second doped region.

15. The electro-optic device of claim 1, wherein the first semiconducting partial active region comprises a first doped region and a second doped region, the first doped region having a doping concentration that is lower than the doping concentration of the second doped region.

16. The electro-optic device of claim 1, wherein the second semiconducting partial active region comprises a first doped region and a second doped region, the first doped region having a doping concentration that is lower than the doping concentration of the second doped region.

17. The electro-optic device of claim 1, wherein the first semiconducting partial active region comprises a first doped region and a second doped region, the first doped region having a doping concentration that is higher than the doping concentration of the second doped region.

18. The electro-optic device of claim 1, wherein the second semiconducting partial active region comprises a first doped region and a second doped region, the first doped region having a doping concentration that is higher than the doping concentration of the second doped region.

19. The electro-optic device of claim 1, wherein the first semiconducting region has a doping concentration that is higher than the doping concentration of the first semiconducting partial active region.

20. The electro-optic device of claim 1, wherein the second semiconducting region has a doping concentration that is higher than the doping concentration of the second semiconducting partial active region.

21. An electro-optic device, comprising:
an insulating layer;
a first semiconducting region disposed above the insulating layer and being doped with doping atoms of a first conductivity type;
a second semiconducting region disposed above the insulating layer and being doped with doping atoms of a second conductivity type; and
an electro-optic active region disposed above the insulating layer and between the first semiconducting region and the second semiconducting region, the electro-optic active region comprising:
a first semiconducting partial active region being doped with doping atoms of the first conductivity type;
a second semiconducting partial active region being doped with doping atoms of the second conductivity type; wherein the material the first semiconducting partial active region is made of is different from the material the second semiconducting partial active region is made of; and
an insulating structure between the first semiconducting partial active region and the second semiconducting partial active region, wherein the insulating structure extends from the surface of the insulating layer through the electro-optic active region to the top of the electro-optic active region.

* * * * *